United States Patent
Sharman et al.

(10) Patent No.: US 12,301,875 B2
(45) Date of Patent: May 13, 2025

(54) VIDEO DATA ENCODING AND DECODING

(71) Applicant: SONY GROUP CORPORATION, Tokyo (JP)

(72) Inventors: Karl James Sharman, Basingstoke (GB); Adrian Richard Browne, Basingstoke (GB); Stephen Mark Keating, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/952,123

(22) Filed: Sep. 23, 2022

(65) Prior Publication Data

US 2023/0028325 A1     Jan. 26, 2023

Related U.S. Application Data

(63) Continuation of application No. PCT/GB2021/050628, filed on Mar. 12, 2021.

(30) Foreign Application Priority Data

Apr. 3, 2020  (GB) ..................................... 2004959

(51) Int. Cl.
*H04N 19/00*  (2014.01)
*H04N 19/122* (2014.01)
(Continued)

(52) U.S. Cl.
CPC ......... *H04N 19/625* (2014.11); *H04N 19/122* (2014.11); *H04N 19/157* (2014.11); *H04N 19/18* (2014.11); *H04N 19/60* (2014.11)

(58) Field of Classification Search
CPC .. H04N 19/625; H04N 19/122; H04N 19/157; H04N 19/18; H04N 19/60; H04N 19/162; H04N 19/176; H04N 19/70
See application file for complete search history.

(56) References Cited

U.S. PATENT DOCUMENTS 6,751,363 B1   6/2004 Natsev
11,122,290 B2 * 9/2021 Jang ..................... H04N 19/513
(Continued)

FOREIGN PATENT DOCUMENTS

EP      3 033 885 A1    6/2015
GB      2512995 A       10/2014
(Continued)

OTHER PUBLICATIONS

International Search Report mailed on Dec. 23, 2021 in PCT/GB2021/050628 filed on Mar. 12, 2021 (7 pages).

(Continued)

*Primary Examiner* — Frank F Huang
(74) *Attorney, Agent, or Firm* — Oblon, McClelland, Maier & Neustadt, L.L.P.

(57) ABSTRACT

A method of encoding video data values, the method including selectively encoding, via circuitry, a high bit depth control flag and, when the high bit depth control flag is set to indicate high bit depth operation, selectively encoding an extended precision flag to indicate at least extended precision operation of a spatial frequency transform stage and encoding the video data values according to a mode of operation defined by the encoded high bit depth control flag and, when encoded, the extended precision flag.

18 Claims, 13 Drawing Sheets

(51) Int. Cl.
  *H04N 19/157* (2014.01)
  *H04N 19/18* (2014.01)
  *H04N 19/625* (2014.01)
  *H04N 19/60* (2014.01)

(56) References Cited

U.S. PATENT DOCUMENTS

| | | | |
|---|---|---|---|
| 11,323,744 | B2 | 5/2022 | Gamei et al. |
| 2009/0116685 | A1 | 5/2009 | Yoo |
| 2017/0140079 | A1 | 5/2017 | Gentilhomme |
| 2017/0340212 | A1 | 11/2017 | Lin |
| 2018/0332289 | A1* | 11/2018 | Huang .................. H04N 19/96 |
| 2019/0349587 | A1* | 11/2019 | Jang .................... H04N 19/124 |
| 2019/0370965 | A1 | 12/2019 | Lay |
| 2019/0387241 | A1* | 12/2019 | Kim .................... H04N 19/105 |
| 2020/0013420 | A1 | 1/2020 | Wallace |
| 2020/0068195 | A1* | 2/2020 | Yoo .................... H04N 19/117 |
| 2020/0177901 | A1* | 6/2020 | Choi ................... H04N 19/186 |
| 2020/0177921 | A1* | 6/2020 | Koo .................... H04N 19/122 |
| 2020/0374531 | A1* | 11/2020 | Zhao ................... H04N 19/91 |
| 2021/0014534 | A1* | 1/2021 | Koo .................... H04N 19/132 |
| 2021/0144376 | A1* | 5/2021 | Tsukuba .............. H04N 19/139 |
| 2021/0211729 | A1* | 7/2021 | Koo .................... H04N 19/18 |
| 2021/0218996 | A1* | 7/2021 | Koo .................... H04N 19/176 |
| 2022/0303542 | A1* | 9/2022 | Paluri ................. H04N 19/172 |

FOREIGN PATENT DOCUMENTS

| | | |
|---|---|---|
| GB | 2517416 A | 2/2015 |
| JP | 2016519514 A | 6/2016 |

OTHER PUBLICATIONS

Sharman, K. et al., "AHG 5 and 18: Internal Precision for High Bit Depths", 14$^{th}$ Meeting Joint Collaborative Team on Video Coding (JCT-VC) of ITU-T SG 16 WP 3 and ISO/IEC JTC 1/SC 29/WG11, Jul. 25, 2013-Aug. 2, 2013, Vienna; URL: http://wftp3.itu.int/av-arch/jctvc-site/, No. JCTVC-N0188-v3, XP030114677, total 25 pages.

Karczewicz, M. et al.; "AHG18: Limiting the worst-case length for coeff_abs_level_remaining syntax element to 32 bits", No. JCTVC-Q0131, (Mar. 26, 2014), 17$^{th}$ Meeting Joint Collaborative Team on Video Coding (JCT-VC) of ISO/IEC JTC1/SC29/WG11 and, Mar. 27, 2014-Apr. 4, 2014; Valencia; URL: http://phenix.intevry.fr/jct/doc_end_user/documents/17_Valencia/wg11/JCTVC-Q0131-v2.zip JCTVC-Q0131.pdf, (Mar. 26, 2014), XP030239594, total 11 pages.

Sharman, K. et al., "AHG 5 and 18: Profiles for Range Extensions", 14$^{th}$ Meeting Joint Collaborative Team on Video Coding (JCT-VC) of ITU-T SG 16 WP 3 and ISO/IEC JTC1/SC 29/WG 11; Jul. 25, 2013-Aug. 2, 2013, Vienna; URL: http://wftp3.itu.int/av-arch/jctvc-site/, No. JCTVC-N0191, XP030114682, total 8 pages.

Sharman, K. et al., "AHG5: Range Extensions and High Bit Depths", 13$^{th}$ Meeting Joint Collaborative Team on Video Coding (JCT-VC) of ITU-T SG 16 WP 3 and ISO/IEC JTC 1/SC 29/WG 11, Document No. JCTVC-M0178, Apr. 18-26, 2013, Incheon; KR, URL: http://phenix.int-evry.fr/jct/doc_end_user/documents/13_Incheon/wg11/JCTVC-M0178-v3.zip JCTVC-M0178_r1.doc, XP030237528, total 21 pages.

Browne, A. et al., "High bit depth coding", 18$^{th}$ Meeting Joint Video Experts Team (JVET) of ITU-T SG 16 WP 3 and ISO/IEC JTC 1/SC 29/WG 11; Apr. 15-24, 2020, by Teleconference; URL: http://phenix.int-evry.fr/mpeg/doc_end_user/documents/130_Alpbach/wg11/m53404-JVET-R0351-v1-JVET-R0351-v1.zip JVET-R0351/JVET-R0351.docx, Document No. JVET-R0351, XP030286877, total 23 pages.

Bross B. et al, Versatile Video Coding (Draft 8) Joint Video Experts Team (JVET) of ITU-T SG 16 WP 3 and ISO/IEC JTC 1/SC 29/WG 11 17th Meeting: Brussels, BE, Jan. 7-17, 2020. JVET-Q2001-vE Mar. 12, 2020.

High Efficiency Video Coding (HEVC) algorithms and Architectures, Editors: Madhukar Budagavi, Gary J. Sullivan, Vivienne Sze; chapter 3; ISBN 978-3-319-06894-7; 2014.

ITU-T, "Series H: Audiovisual and Multimedia Systems Infrastructure of audiovisual services—Coding of moving video High efficiency video coding", Recommendation ITU-T H.265, Dec. 2016, 664 pages.

\* cited by examiner

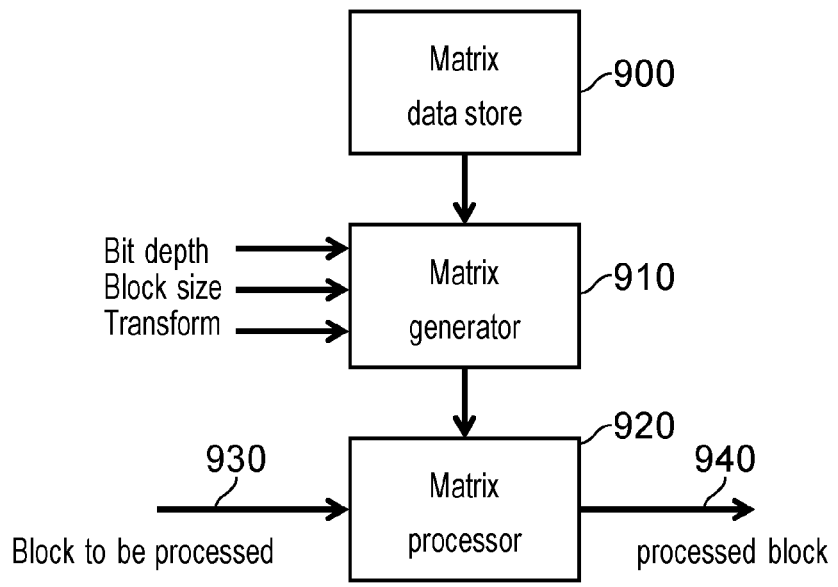
FIG. 9
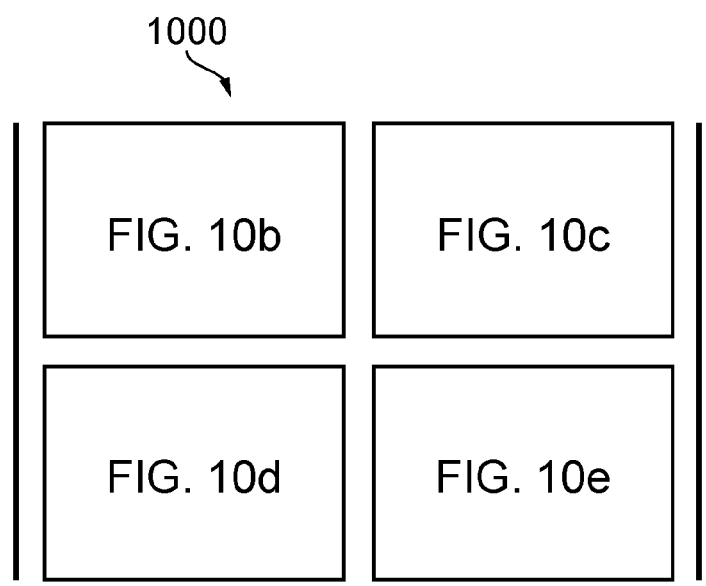
FIG. 10a (DCT2 $M_{64}$)

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| aa | aa | aa | aa | aa | aa | aa | aa | aa | aa | aa | aa | aa | aa | aa | aa | aa | Aa | aa | aa | aa | aa | aa | aa | aa | aa | aa | aa | aa | aa | aa |
| bf | bg | bh | bi | bj | bk | bl | bm | bn | bo | bp | bq | br | bs | bt | bu | bv | bw | Bx | by | bz | ca | cb | cc | cd | ce | cf | cg | ch | ci | cj | ck |
| ap | aq | ar | as | at | au | av | aw | ax | ay | az | ba | bb | bc | bd | be | -be | -bd | -bc | -bb | -ba | -az | -ay | -ax | -aw | -av | -au | -at | -as | -ar | -aq | -ap |
| bg | bj | bm | bp | bs | bv | by | cb | ce | ch | ck | -ci | -cf | -cc | -bz | -bw | -bt | -bq | -bn | -bk | -bh | -bf | -bi | -bl | -bo | -br | -bu | -bx | -ca | -cd | -cg | -cj |
| ah | ai | aj | ak | al | am | an | ao | -ao | -an | -am | -al | -ak | -aj | -ai | -ah | -ah | -ai | -aj | -ak | -al | -am | -an | -ao | ao | an | am | al | ak | aj | ai | ah |
| bh | bm | br | bw | cb | cg | -ck | -cf | -ca | -bv | -bq | -bl | -bg | -bi | -bn | -bs | -bx | -cc | -ch | cj | ce | bz | bu | bp | bk | bf | bj | bo | bt | by | cd | ci |
| aq | at | aw | az | bc | -be | -bb | -ay | -av | -as | -ap | -ar | -au | -ax | -ba | -bd | bd | ba | Ax | au | ar | ap | as | av | ay | bb | be | -bc | -az | -aw | -at | -aq |
| bi | bp | bw | cd | ck | -ce | -bx | -bq | -bj | -bh | -bo | -bv | -cc | -cj | cf | by | br | bk | Bg | bn | bu | cb | ci | -cg | -bz | -bs | -bl | -bf | -bm | -bt | -ca | -ch |
| ad | ae | af | ag | -ag | -af | -ae | -ad | -ad | -ae | -af | -ag | ag | af | ae | ad | ad | ae | Af | ag | -ag | -af | -ae | -ad | -ad | -ae | -af | -ag | ag | af | ae | ad |
| bj | bs | cb | ck | -cc | -bt | -bk | -bi | -br | -ca | -cj | cd | bu | bl | bh | bq | bz | ci | -ce | -bv | -bm | -bg | -bp | -by | -ch | cf | bw | bn | bf | bo | bx | cg |
| ar | aw | bb | -bd | -ay | -at | -ap | -au | -az | -be | ba | av | aq | as | ax | bc | -bc | -ax | -as | -aq | -av | -ba | be | az | au | ap | at | ay | bd | -bb | -aw | -ar |
| bk | bv | cg | -ce | -bt | -bi | -bm | -bx | -ci | cc | br | bg | bo | bz | ck | -ca | -bp | -bf | -bq | -cb | cj | by | bn | bh | bs | cd | -ch | -bw | -bl | -bj | -bu | -cf |
| ai | al | ao | -am | -aj | -ah | -ak | -an | an | ak | ah | aj | am | -ao | -al | -ai | -ai | -al | -ao | am | aj | ah | ak | an | -an | -ak | -ah | -aj | -am | ao | al | ai |
| bl | by | -ck | -bx | -bk | -bm | -bz | cj | bw | bj | bn | ca | -ci | -bv | -bi | -bo | -cb | ch | Bu | bh | bp | cc | -cg | -bt | -bg | -bq | -cd | cf | bs | bf | br | ce |
| as | az | -bd | -aw | -ap | -av | -bc | ba | at | ar | ay | -be | -ax | -aq | -au | -bb | bb | au | Aq | ax | be | -ay | -ar | -at | -ba | bc | av | ap | aw | bd | -az | -as |
| bm | cb | -cf | -bq | -bi | -bx | cj | bu | bf | bt | ci | -by | -bj | -bp | -ce | cc | bn | bl | Ca | -cg | -br | -bh | -bw | ck | bv | bg | bs | ch | -bz | -bk | -bo | -cd |
| ab | ac | -ac | -ab | -ab | -ac | ac | ab | ab | ac | -ac | -ab | -ab | -ac | ac | ab | ab | ac | -ac | -ab | -ab | -ac | ac | ab | ab | ac | -ac | -ab | -ab | -ac | ac | ab |
| bn | ce | -ca | -bj | -br | -ci | bw | bf | bv | -cj | -bs | -bi | -bz | cf | bo | bm | cd | -cb | -bk | -bq | -ch | bx | bg | bu | -ck | -bt | -bh | -by | cg | bp | bl | cc |
| at | bc | -ay | -ap | -ax | bd | au | as | bb | -az | -aq | -aw | be | av | ar | ba | -ba | -ar | -av | -be | aw | aq | az | -bb | -as | -au | -bd | ax | ap | ay | -bc | -at |
| bo | ch | -bv | -bh | -ca | cc | bj | bt | -cj | -bq | -bm | -cf | bx | bf | by | -ce | -bl | -br | -ck | bs | bk | cd | -bz | -bg | -bw | cg | bn | bp | ci | -bu | -bi | -cb |
| aj | ao | -ak | -ai | -an | al | ah | am | -am | -ah | -al | an | ai | ak | -ao | -aj | -aj | -ao | Ak | ai | an | -al | -ah | -am | am | ah | al | -an | -ai | -ak | ao | aj |
| bp | ck | -bq | -bo | -cj | br | bn | ci | -bs | -bm | -ch | bt | bl | cg | -bu | -bk | -cf | bv | Bj | ce | -bw | -bi | -cd | bx | bh | cc | -by | -bg | -cb | bz | bf | ca |
| au | -be | -at | -av | bd | as | aw | -bc | -ar | -ax | bb | aq | ay | -ba | -ap | -az | az | ap | Ba | -ay | -aq | -bb | ax | ar | bc | -aw | -as | -bd | av | at | be | -au |
| bq | -ci | -bl | -bv | cd | bg | ca | -by | -bi | -cf | bt | bn | ck | -bo | -bs | cg | bj | bx | -cb | -bf | -cc | bw | bk | ch | -br | -bp | cj | bm | bu | -ce | -bh | -bz |
| ae | -ag | -ad | -af | af | ad | ag | -ae | -ae | ag | ad | af | -af | -ad | -ag | ae | ae | -ag | -ad | -af | af | ad | ag | -ae | -ae | ag | ad | af | -af | -ad | -ag | ae |
| br | -cf | -bg | -cc | bu | bo | -ci | -bj | -bz | bx | bl | ck | -bm | -bw | ca | bi | ch | -bp | -bt | cd | bf | ce | -bs | -bq | cg | bh | cb | -bv | -bn | cj | bk | by |
| av | -bb | -ap | -bc | au | aw | -ba | -aq | -bd | at | ax | -az | -ar | -be | as | ay | -ay | -as | Be | ar | az | -ax | -at | bd | aq | ba | -aw | -au | bc | ap | bb | -av |
| bs | -cc | -bi | -cj | bl | bz | -bv | -bp | cf | bf | cg | -bo | -bw | by | bm | -ci | -bh | -cd | Br | bt | -cb | -bj | -ck | bk | ca | -bu | -bq | ce | bg | ch | -bn | -bx |
| ak | -am | -ai | ao | ah | an | -aj | -al | al | aj | -an | -ah | -ao | ai | am | -ak | -ak | am | Ai | -ao | -ah | -an | aj | al | -al | -aj | an | ah | ao | -ai | -am | ak |
| bt | -bz | -bn | cf | bh | ck | -bi | -ce | bo | by | -bu | -bs | ca | bm | -cg | -bg | -cj | bj | Cd | -bp | -bx | bv | br | -cb | -bl | bf | ci | -bk | -cc | bq | bw |
| aw | -ay | -au | ba | as | -bc | -aq | be | ap | bd | -ar | -bb | at | az | -av | -ax | ax | av | -az | -at | bb | ar | -bd | -ap | -be | aq | bc | -as | -ba | au | ay | -aw |
| bu | -bw | -bs | by | bq | -ca | -bo | cc | bm | -ce | -bk | cg | bi | -ci | -bg | ck | bf | cj | -bh | -ch | bj | cf | -bl | -cd | bn | cb | -bp | -bz | br | bx | -bt | -bv |

FIG. 10b (upper left)

aa aa aa aa aa aa aa aa aa aa aa aa aa aa aa aa aa aa Aa aa aa aa aa aa aa aa aa aa aa aa aa aa
-ck -cj -ci -ch -cg -cf -ce -cd -cc -cb -ca -bz -by -bx -bw -bv -bu -bt -bs -br -bq -bp -bo -bn -bm -bl -bk -bj -bi -bh -bg -bf
-ap -aq -ar -as -at -au -av -aw -ax -ay -az -ba -bb -bc -bd -be be bd Bc bb ba az ay ax aw av au at as ar aq ap
cj cg cd ca bx bu br bo bl bi bf bh bk bn bq bt bw bz Cc cf ci -ck -ch -ce -cb -by -bv -bs -bp -bm -bj -bg
ah ai aj ak al am an ao -ao -an -am -al -ak -aj -ai -ah -ah -ai -aj -ak -al -am -an -ao ao an am al ak aj ai ah
-ci -cd -by -bt -bo -bj -bf -bk -bp -bu -bz -ce -cj ch cc bx bs bn Bi bg bl bq bv ca cf ck -cg -cb -bw -br -bm -bh
-aq -at -aw -az -bc be bb ay av as ap ar au ax ba bd -bd -ba -ax -au -ar -ap -as -av -ay -bb -be b

FIG. 10d (lower left)

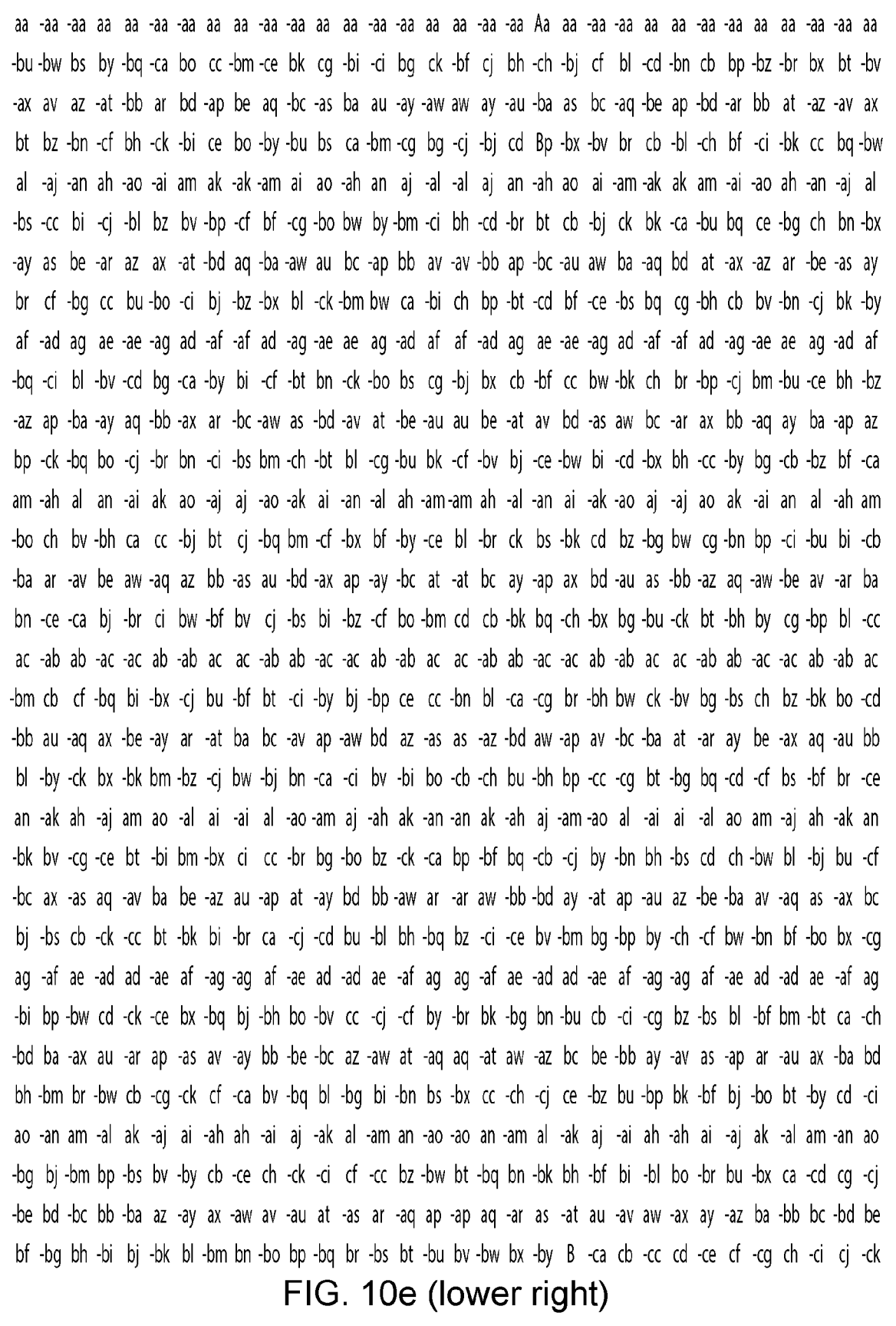

aa -aa -aa aa aa -aa -aa aa aa -aa -aa aa aa -aa -aa aa aa -aa -aa Aa aa -aa -aa aa aa -aa -aa aa aa -aa -aa aa
-bu -bw bs by -bq -ca bo cc -bm -ce bk cg -bi -ci bg ck -bf cj bh -ch -bj cf bl -cd -bn cb bp -bz -br bx bt -bv
-ax av az -at -bb ar bd -ap be aq -bc -as ba au -ay -aw aw ay -au -ba as bc -aq -be ap -bd -ar bb at -az -av ax
bt bz -bn -cf bh -ck -bi ce bo -by -bu bs ca -bm -cg bg -cj -bj cd Bp -bx -bv br cb -bl -ch bf -ci -bk cc bq -bw
al -aj -an ah -ao -ai am ak -ak -am ai ao -ah an aj -al -al aj an -ah ao ai -am -ak ak am -ai -ao ah -an -aj al
-bs -cc bi -cj -bl bz bv -bp -cf bf -cg -bo bw by -bm -ci bh -cd -br bt cb

| Name | Alternate | 14 bit | 6 bit |
|------|-----------|--------|-------|
| a | aa | 16384 | 64 |
| b | ab | 21266 | 83 |
| c | ac | 9224 | 36 |
| d | ad | 22813 | 89 |
| e | ae | 19244 | 75 |
| f | af | 12769 | 50 |
| g | ag | 4563 | 18 |
| h | ah | 23129 | 90 |
| i | ai | 22063 | 87 |
| j | aj | 20450 | 80 |
| k | ak | 17972 | 70 |
| l | al | 14642 | 57 |
| m | am | 11109 | 43 |
| n | an | 6446 | 25 |
| o | ao | 2316 | 9 |
| p | ap | 23106 | 90 |
| q | aq | 22852 | 90 |
| r | ar | 22445 | 88 |
| s | as | 21848 | 85 |
| t | at | 20995 | 82 |
| u | au | 19810 | 78 |
| v | av | 18601 | 73 |
| w | aw | 17143 | 67 |
| x | ax | 15718 | 61 |
| y | ay | 13853 | 54 |
| z | az | 11749 | 46 |
| A | ba | 9846 | 38 |
| B | bb | 7908 | 31 |
| C | bc | 5573 | 22 |
| D | bd | 3281 | 13 |
| E | be | 946 | 4 |

| Name | Alternate | 14 bit | 6 bit |
|------|-----------|--------|-------|
|  | bf | 23360 | 91 |
|  | bg | 23053 | 90 |
|  | bh | 23048 | 90 |
|  | bi | 23023 | 90 |
|  | bj | 22610 | 88 |
|  | bk | 22339 | 87 |
|  | bl | 21936 | 86 |
|  | bm | 21502 | 84 |
|  | bn | 21266 | 83 |
|  | bo | 20730 | 81 |
|  | bp | 20251 | 79 |
|  | bq | 19726 | 77 |
|  | br | 18731 | 73 |
|  | bs | 18201 | 71 |
|  | bt | 17638 | 69 |
|  | bu | 16604 | 65 |
|  | bv | 15881 | 62 |
|  | bw | 15084 | 59 |
|  | bx | 14322 | 56 |
|  | by | 13340 | 52 |
|  | bz | 12238 | 48 |
|  | ca | 11330 | 44 |
|  | cb | 10493 | 41 |
|  | cc | 9428 | 37 |
|  | cd | 8426 | 33 |
|  | ce | 7100 | 28 |
|  | cf | 6151 | 24 |
|  | cg | 5101 | 20 |
|  | ch | 3848 | 15 |
|  | ci | 2734 | 11 |
|  | cj | 1754 | 7 |
|  | ck | 574 | 2 |

FIG. 11 (DCT2 alternate names)

| Label | 4x4 | | 8x8 | | 16x16 | | 32x32 | |
|---|---|---|---|---|---|---|---|---|
| | 14 bit | 6 bit | 14 bit | 6 bit | 14 bit | 6 bit | 14 bit | 6 bit |
| a | 21505 | 84 | 22018 | 86 | 22569 | 88 | 23065 | 90 |
| b | 18893 | 74 | 21790 | 85 | 22542 | 88 | 23136 | 90 |
| c | 14081 | 55 | 19958 | 78 | 22202 | 87 | 22715 | 89 |
| d | 7425 | 29 | 18154 | 71 | 21664 | 85 | 22533 | 88 |
| e | | | 15363 | 60 | 20754 | 81 | 22544 | 87 |
| f | | | 11754 | 46 | 19738 | 77 | 22053 | 86 |
| g | | | 8148 | 32 | 18787 | 73 | 21901 | 85 |
| h | | | 4350 | 17 | 17369 | 68 | 21463 | 84 |
| i | | | | | 15781 | 62 | 21131 | 82 |
| j | | | | | 14044 | 55 | 20385 | 80 |
| k | | | | | 12209 | 48 | 20019 | 78 |
| l | | | | | 10360 | 40 | 19708 | 77 |
| m | | | | | 8498 | 33 | 19007 | 74 |
| n | | | | | 6421 | 25 | 18415 | 72 |
| o | | | | | 4295 | 17 | 17448 | 68 |
| p | | | | | 1967 | 8 | 16894 | 66 |
| q | | | | | | | 16143 | 63 |
| r | | | | | | | 15230 | 60 |
| s | | | | | | | 14312 | 56 |
| t | | | | | | | 13616 | 53 |
| u | | | | | | | 12679 | 50 |
| v | | | | | | | 11526 | 46 |
| w | | | | | | | 10770 | 42 |
| x | | | | | | | 9720 | 38 |
| y | | | | | | | 8606 | 34 |
| z | | | | | | | 7734 | 30 |
| A | | | | | | | 6623 | 26 |
| B | | | | | | | 5414 | 21 |
| C | | | | | | | 4478 | 17 |
| D | | | | | | | 3225 | 13 |
| E | | | | | | | 2291 | 9 |
| F | | | | | | | 1043 | 4 |

FIG. 12 (DCT8 matrix values)

| Label | 4x4 | | 8x8 | | 16x16 | | 32x32 | |
|---|---|---|---|---|---|---|---|---|
| | 14 bit | 6 bit | 14 bit | 6 bit | 14 bit | 6 bit | 14 bit | 6 bit |
| a | 7425 | 29 | 4350 | 17 | 1967 | 8 | 1043 | 4 |
| b | 14081 | 55 | 8148 | 32 | 4295 | 17 | 2291 | 9 |
| c | 18893 | 74 | 11754 | 46 | 6421 | 25 | 3225 | 13 |
| d | 21505 | 84 | 15363 | 60 | 8498 | 33 | 4478 | 17 |
| e | | | 18154 | 71 | 10360 | 40 | 5414 | 21 |
| f | | | 19958 | 78 | 12209 | 48 | 6623 | 26 |
| g | | | 21790 | 85 | 14044 | 55 | 7734 | 30 |
| h | | | 22018 | 86 | 15781 | 62 | 8606 | 34 |
| i | | | | | 17369 | 68 | 9720 | 38 |
| j | | | | | 18787 | 73 | 10770 | 42 |
| k | | | | | 19738 | 77 | 11526 | 46 |
| l | | | | | 20754 | 81 | 12679 | 50 |
| m | | | | | 21664 | 85 | 13616 | 53 |
| n | | | | | 22202 | 87 | 14312 | 56 |
| o | | | | | 22542 | 88 | 15230 | 60 |
| p | | | | | 22569 | 88 | 16143 | 63 |
| q | | | | | | | 16894 | 66 |
| r | | | | | | | 17448 | 68 |
| s | | | | | | | 18415 | 72 |
| t | | | | | | | 19007 | 74 |
| u | | | | | | | 19708 | 77 |
| v | | | | | | | 20019 | 78 |
| w | | | | | | | 20385 | 80 |
| x | | | | | | | 21131 | 82 |
| y | | | | | | | 21463 | 84 |
| z | | | | | | | 21901 | 85 |
| A | | | | | | | 22053 | 86 |
| B | | | | | | | 22544 | 87 |
| C | | | | | | | 22533 | 88 |
| D | | | | | | | 22715 | 89 |
| E | | | | | | | 23136 | 90 |
| F | | | | | | | 23065 | 90 |

FIG. 13 (DST7 matrix values)

```
high_bit_depth_control_flag          u(1)
if (high_bit_depth_control_flag) {
    extended_precision_flag          u(1)
}
```
FIG. 14a
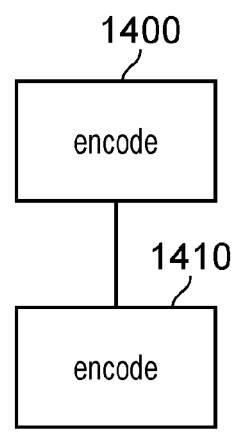
FIG. 14b
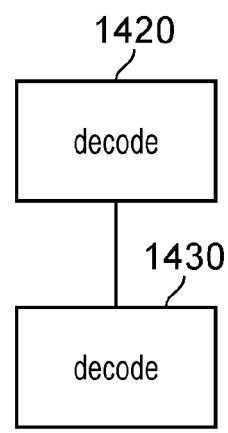
FIG. 14c

VIDEO DATA ENCODING AND DECODING

BACKGROUND

Field

This disclosure relates to video data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several systems, such as video or image data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

SUMMARY

The present disclosure addresses or mitigates problems arising from this processing.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 schematically illustrates a transform unit or an inverse transform unit;

Figure 10D:
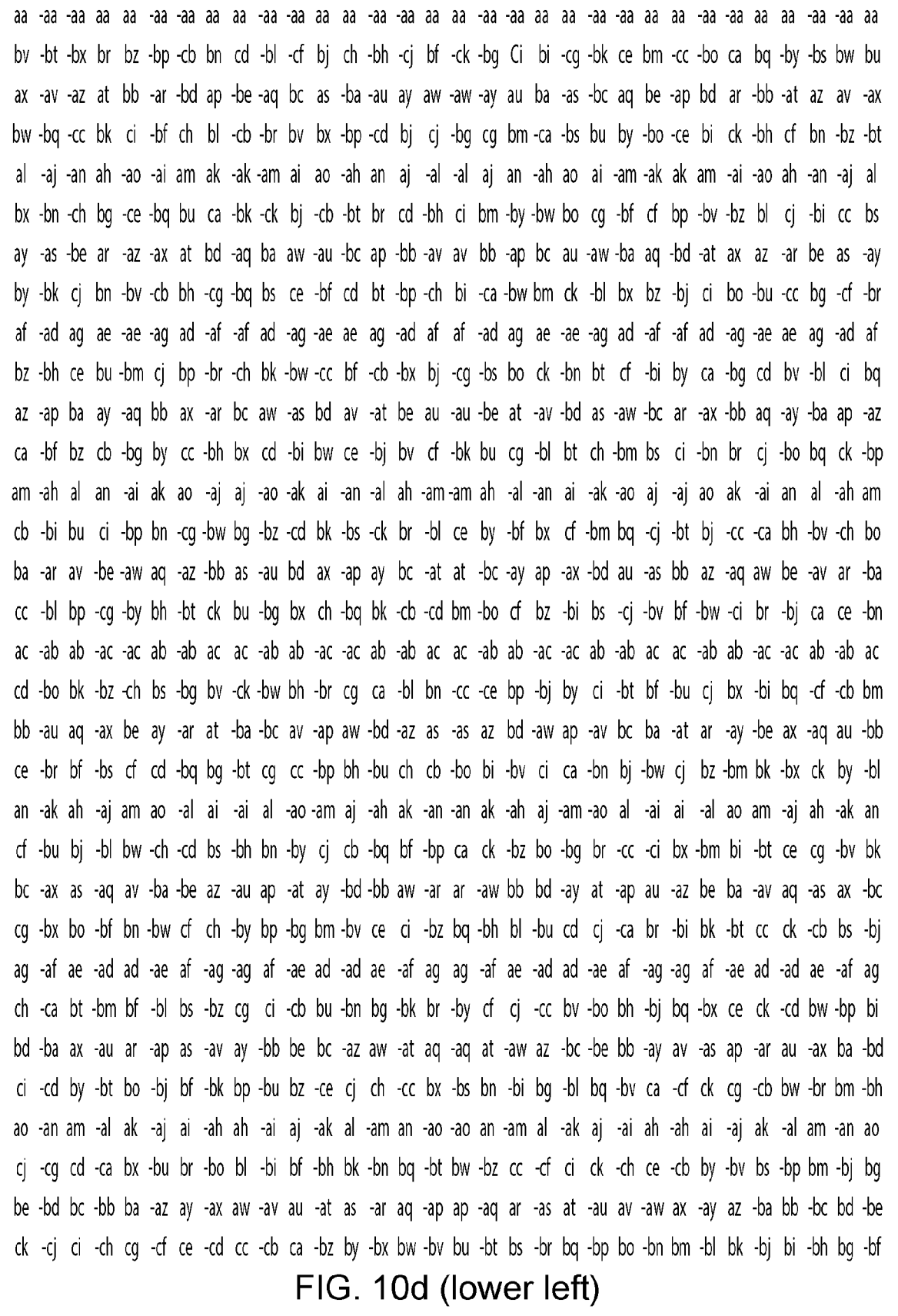

FIGS. 10a to 10e and 11 schematically illustrate coefficients for a DTC2 transform;

FIG. 12 schematically illustrates coefficients for a DCT8 transform;

FIG. 13 schematically illustrates coefficients for a DST7 transform;

FIG. 14a schematically illustrates a flag structure; and

FIGS. 14b, 14c and 15 are schematic flowcharts illustrating respective methods.

DESCRIPTION OF THE PREFERRED EMBODIMENTS

Figure 1:
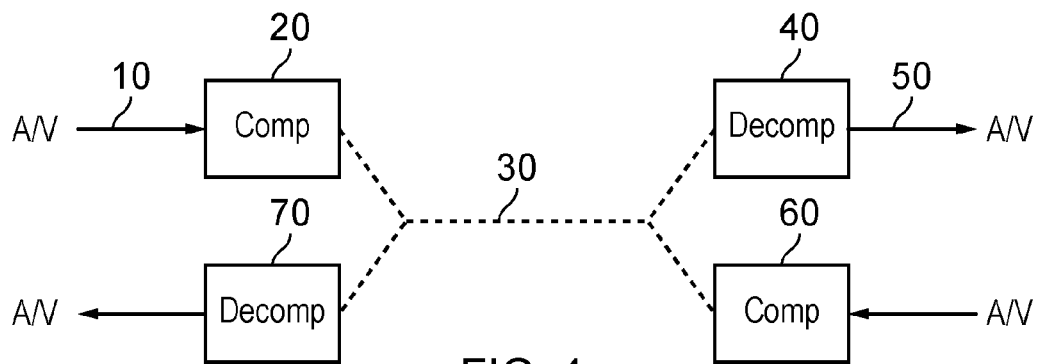
FIG. 1 schematically illustrates an audio/video (NV) data transmission and reception system using video data compression and decompression.

Referring now to the drawings, FIGS. 1-4 are provided to give schematic illustrations of apparatus or systems making use of the compression and/or decompression apparatus to be described below in connection with embodiments of the present technology.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present technology.

FIG. 1 schematically illustrates an audio/video data transmission and reception system using video data compression and decompression. In this example, the data values to be encoded or decoded represent image data.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is uni-directional, only one of the nodes would require a compression apparatus and the other node would only require a decompression apparatus.

Figure 2:
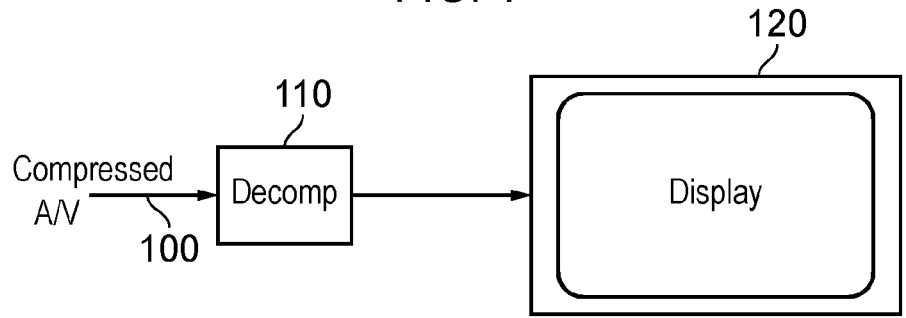
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 maybe provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
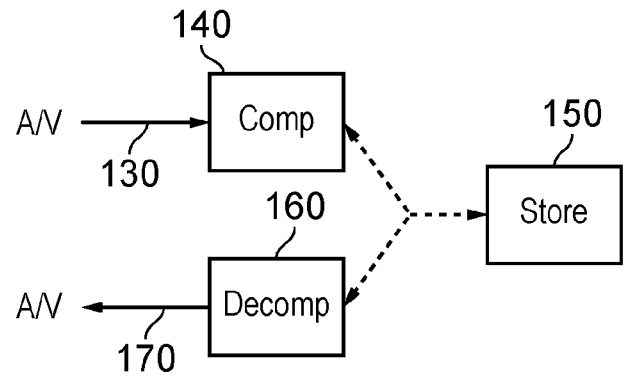
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the storage device 150 and passed to a decompression apparatus 160 for decompression to provide an output audio/video signal 170.

It will be appreciated that the compressed or encoded signal, and a storage medium such as a machine-readable non-transitory storage medium, storing that signal, are considered as embodiments of the present technology.

Figure 4:
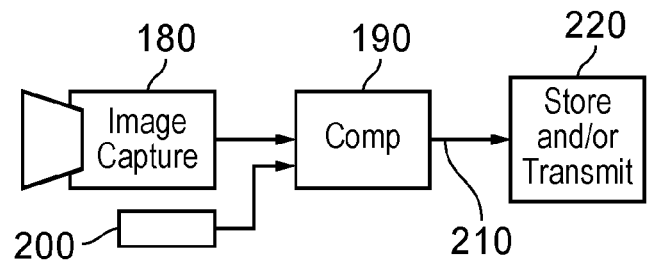
FIG. 4 schematically illustrates a video camera using video data compression.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

FIG. 4 therefore provides an example of a video capture apparatus comprising an image sensor and an encoding apparatus of the type to be discussed below. FIG. 2 therefore provides an example of a decoding apparatus of the type to be discussed below and a display to which the decoded images are output.

A combination of FIGS. 2 and 4 may provide a video capture apparatus comprising an image sensor 180 and encoding apparatus 190, decoding apparatus 110 and a display 120 to which the decoded images are output.

Figure 5:
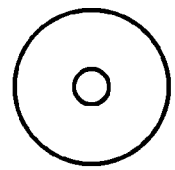
FIGS. 5 and 6 schematically illustrate storage media.
Figure 6:

FIGS. 5 and 6 schematically illustrate storage media, which store (for example) the compressed data generated by the apparatus 20, 60, the compressed data input to the apparatus 110 or the storage media or stages 150, 220. FIG. 5 schematically illustrates a disc storage medium such as a magnetic or optical disc, and FIG. 6 schematically illustrates a solid state storage medium such as a flash memory. Note that FIGS. 5 and 6 can also provide examples of non-transitory machine-readable storage media which store computer software which, when executed by a computer, causes the computer to carry out one or more of the methods to be discussed below.

Therefore, the above arrangements provide examples of video storage, capture, transmission or reception apparatuses embodying any of the present techniques.

Figure 7:
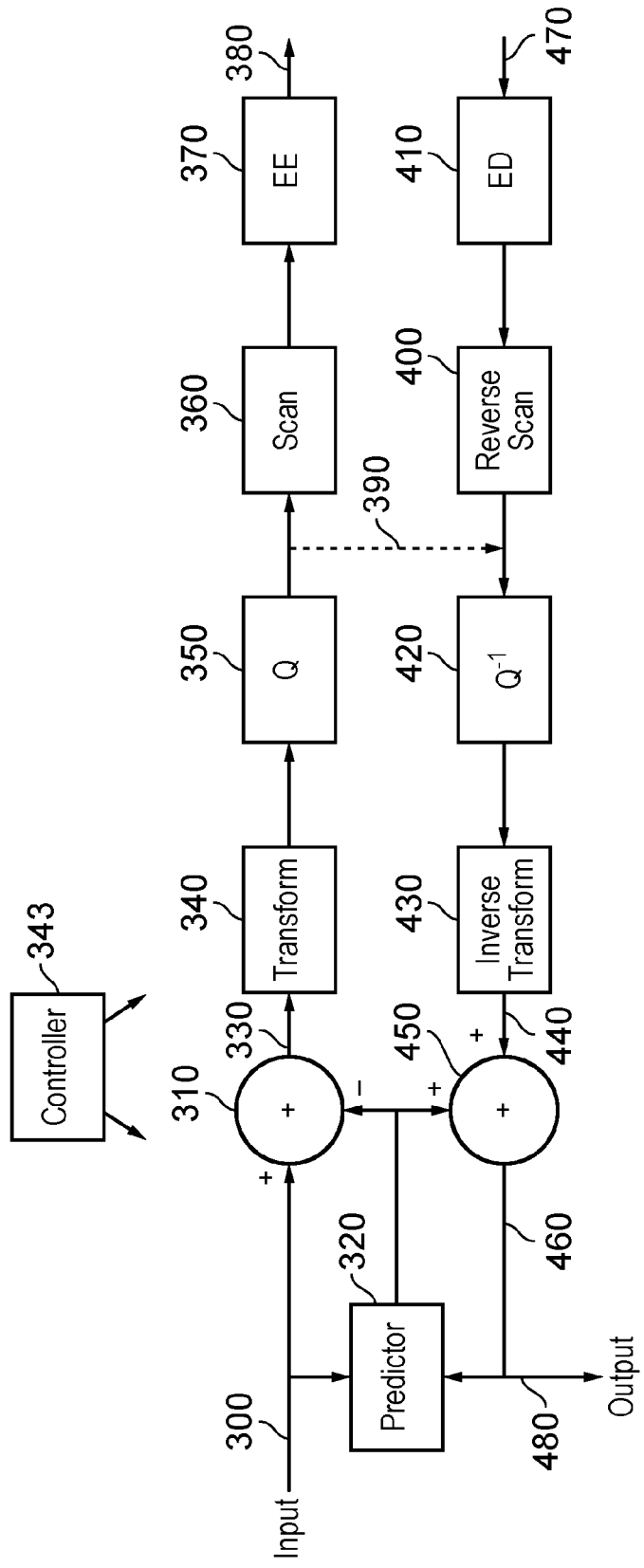
FIG. 7 provides a schematic overview of a video data compression and decompression apparatus.

FIG. 7 provides a schematic overview of a video or image data compression (encoding) and decompression (decoding) apparatus, for encoding and/or decoding video or image data representing one or more images.

A controller 343 controls the overall operation of the apparatus and, in particular when referring to a compression mode, controls a trial encoding processes by acting as a selector to select various modes of operation such as block sizes and shapes, and whether the video data is to be encoded losslessly or otherwise. The controller is considered to form part of the image encoder or image decoder (as the case may be). Successive images of an input video signal 300 are supplied to an adder 310 and to an image predictor 320. The image predictor 320 will be described below in more detail with reference to FIG. 8. The image encoder or decoder (as the case may be) plus the intra-image predictor of FIG. 8 may use features from the apparatus of FIG. 7. This does not mean that the image encoder or decoder necessarily requires every feature of FIG. 7 however.

The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and predicted images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well such that the predicted image content is similar to the image content to be encoded, the expectation is that the residual image data will contain less information (less energy) than the input image and so will be easier to encode into a small amount of encoded data.

Therefore, encoding (using the adder 310) involves predicting an image region for an image to be encoded; and generating a residual image region dependent upon the difference between the predicted image region and a corresponding region of the image to be encoded. In connection with the techniques to be discussed below, the ordered array of data values comprises data values of a representation of the residual image region. Decoding involves predicting an image region for an image to be decoded; generating a residual image region indicative of differences between the predicted image region and a corresponding region of the image to be decoded; in which the ordered array of data values comprises data values of a representation of the residual image region; and combining the predicted image region and the residual image region.

The remainder of the apparatus acting as an encoder (to encode the residual or difference image) will now be described.

The residual image data 330 is supplied to a transform unit or circuitry 340 which generates a discrete cosine transform (DCT) representation of blocks or regions of the residual image data. The DCT technique itself is well known and will not be described in detail here. Note also that the use of DCT is only illustrative of one example arrangement.

Other transforms which might be used include, for example, the discrete sine transform (DST). A transform could also comprise a sequence or cascade of individual transforms, such as an arrangement in which one transform is followed (whether directly or not) by another transform. The choice of transform may be determined explicitly and/or be dependent upon side information used to configure the encoder and decoder. In other examples a so-called "transform skip" mode can selectively be used in which no transform is applied.

Therefore, in examples, an encoding and/or decoding method comprises predicting an image region for an image to be encoded; and generating a residual image region dependent upon the difference between the predicted image region and a corresponding region of the image to be encoded; in which the ordered array of data values (to be discussed below) comprises data values of a representation of the residual image region.

The output of the transform unit 340, which is to say (in an example), a set of DCT coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called up-right diagonal scanning order.

The scanning order can be different, as between transform-skip blocks and transform blocks (blocks which have undergone at least one spatial frequency transformation).

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, whether the compressed data was transformed or transform-skipped or the like, provides a compressed output video signal 380.

However, a return path 390 is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered (in at least some examples) to be "lossless", which is to say that it can be reversed to arrive at exactly the same data which was first supplied to the entropy encoder 370. So, in such examples the return path can be implemented before the entropy encoding stage. Indeed, the scanning process carried out by the scan unit 360 is also considered lossless, so in the present embodiment the return path 390 is from the output of the quantiser 350 to the input of a complimentary inverse quantiser 420. In instances where loss or potential loss is introduced by a stage, that stage (and its inverse) may be included in the feedback loop formed by the return path. For example, the entropy encoding stage can at least in principle be made lossy, for example by techniques in which bits are encoded within parity information. In such an instance, the entropy encoding and decoding should form part of the feedback loop.

In general terms, an entropy decoder 410, the reverse scan unit 400, an inverse quantiser 420 and an inverse transform unit or circuitry 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460 (although this may be subject to so-called loop filtering and/or other filtering before being output—see below). This forms one input to the image predictor 320, as will be described below.

Turning now to the decoding process applied to decompress a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. So, at the decoder side, the decoder reconstructs a version of the residual image and then applies this (by the adder 450) to the predicted version of the image (on a block by block basis) so as to decode each block. In straightforward terms, the output 460 of the adder 450 forms the output decompressed video signal 480 (subject to the filtering processes discussed below). In practice, further filtering may optionally be applied (for example, by a loop filter 565 shown in FIG. 8 but omitted from FIG. 7 for clarity of the higher level diagram of FIG. 7) before the signal is output.

Figure 8:
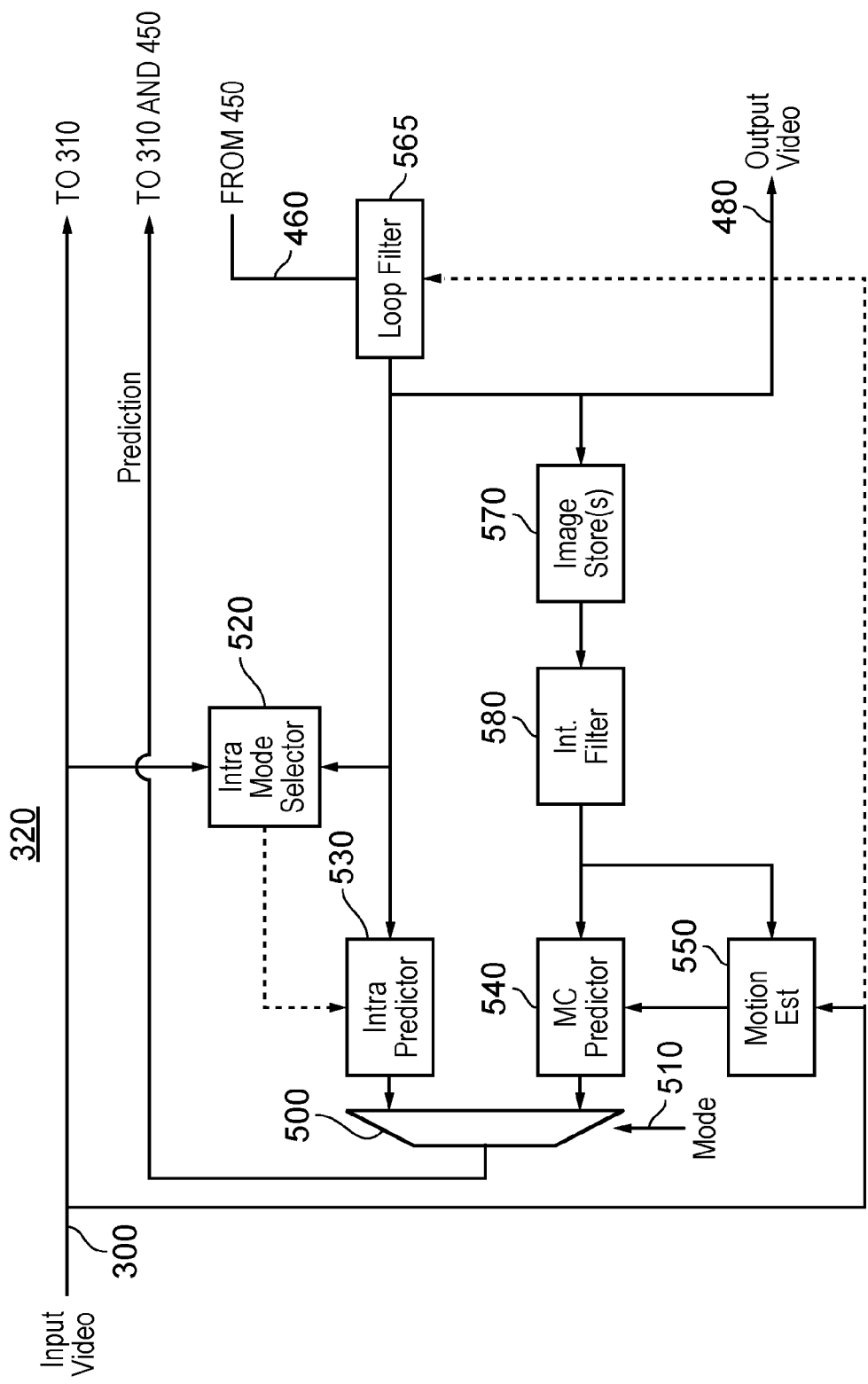
FIG. 8 schematically illustrates a predictor.

The apparatus of FIGS. 7 and 8 can act as a compression (encoding) apparatus or a decompression (decoding) apparatus. The functions of the two types of apparatus substantially overlap. The scan unit 360 and entropy encoder 370 are not used in a decompression mode, and the operation of the predictor 320 (which will be described in detail below) and other units follow mode and parameter information contained in the received compressed bit-stream rather than generating such information themselves.

FIG. 8 schematically illustrates the generation of predicted images, and in particular the operation of the image predictor 320.

There are two basic modes of prediction carried out by the image predictor 320: so-called intra-image prediction and so-called inter-image, or motion-compensated (MC), prediction. At the encoder side, each involves detecting a prediction direction in respect of a current block to be predicted, and generating a predicted block of samples according to other samples (in the same (intra) or another (inter) image). By virtue of the units 310 or 450, the difference between the predicted block and the actual block is encoded or applied so as to encode or decode the block respectively.

(At the decoder, or at the reverse decoding side of the encoder, the detection of a prediction direction may be in response to data associated with the encoded data by the encoder, indicating which direction was used at the encoder. Or the detection may be in response to the same factors as those on which the decision was made at the encoder).

Intra-image prediction bases a prediction of the content of a block or region of the image on data from within the same image. This corresponds to so-called I-frame encoding in other video compression techniques. In contrast to I-frame encoding, however, which involves encoding the whole image by intra-encoding, in the present embodiments the choice between intra- and inter-encoding can be made on a block-by-block basis, though in other embodiments the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

A technique known as "block copy" prediction is in some respects a hybrid of the two, as it uses a vector to indicate a block of samples at a position displaced from the currently predicted block within the same image, which should be copied to form the currently predicted block.

Returning to FIG. 8, two image prediction arrangements (corresponding to intra- and inter-image prediction) are shown, the results of which are selected by a multiplexer 500 under the control of a mode signal 510 (for example, from the controller 343) so as to provide blocks of the predicted image for supply to the adders 310 and 450. The choice is made in dependence upon which selection gives the lowest "energy" (which, as discussed above, may be considered as information content requiring encoding), and the choice is signalled to the decoder within the encoded output datastream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other examples, a trial encoding can be carried out for each selection or potential selection, with a choice then being made according to the cost of each potential selection in terms of one or both of the number of bits required for encoding and distortion to the picture.

The actual prediction, in the intra-encoding system, is made on the basis of image blocks received as part of the signal 460 (as filtered by loop filtering; see below), which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

Accordingly, the units 530 and 540 (operating with the estimator 550) each act as detectors to detect a prediction direction in respect of a current block to be predicted, and as a generator to generate a predicted block of samples (forming part of the prediction passed to the units 310 and 450) according to other samples defined by the prediction direction.

The processing applied to the signal 460 will now be described.

Firstly, the signal may be filtered by a so-called loop filter 565. Various types of loop filters may be used. One technique involves applying a "deblocking" filter to remove or at least tend to reduce the effects of the block-based processing carried out by the transform unit 340 and subsequent operations. A further technique involving applying a so-called sample adaptive offset (SAO) filter may also be used. In general terms, in a sample adaptive offset filter, filter parameter data (derived at the encoder and communicated to the decoder) defines one or more offset amounts to be selectively combined with a given intermediate video sample (a sample of the signal 460) by the sample adaptive offset filter in dependence upon a value of: (i) the given intermediate video sample; or (ii) one or more intermediate video samples having a predetermined spatial relationship to the given intermediate video sample.

Also, an adaptive loop filter is optionally applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data-stream.

Techniques to be discussed below relate to the handling of parameter data relating to the operation of filters. The actual filtering operations (such as SAO filtering) may use otherwise known techniques.

The filtered output from the loop filter unit 565 in fact forms the output video signal 480 when the apparatus is operating as a decompression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images may be passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

The way in which an image is partitioned for compression processing will now be described. At a basic level, an image to be compressed is considered as an array of blocks or regions of samples. The splitting of an image into such blocks or regions can be carried out by a decision tree, such as that described in SERIES H: AUDIOVISUAL AND MULTIMEDIA SYSTEMS Infrastructure of audiovisual services—Coding of moving video High efficiency video coding Recommendation ITU-T H.265 12/2016. Also: High Efficiency Video Coding (HEVC) Algorithms and Architectures, chapter 3, Editors: Madhukar Budagavi, Gary J. Sullivan, Vivienne Sze; ISBN 978-3-319-06894-7; 2014 which are incorporated herein in their respective entireties by reference. Further background information is provided in [1] "Versatile Video Coding (Draft 8)", JVET-Q2001-vE, B. Bross, J. Chen, S. Liu and Y-K. Wang, which is also incorporated herein in its entirety by reference.

In some examples, the resulting blocks or regions have sizes and, in some cases, shapes which, by virtue of the decision tree, can generally follow the disposition of image features within the image. This in itself can allow for an improved encoding efficiency because samples representing or following similar image features would tend to be grouped together by such an arrangement. In some examples, square blocks or regions of different sizes (such as 4×4 samples up to, say, 64×64 or larger blocks) are available for selection. In other example arrangements, blocks or regions of different shapes such as rectangular blocks (for example, vertically or horizontally oriented) can be used. Other non-square and non-rectangular blocks are envisaged. The result of the division of the image into such blocks or regions is (in at least the present examples) that each sample of an image is allocated to one, and only one, such block or region.

Transform Matrices

The following discussion relates to aspects of the transform unit 340 and the inverse transform unit 430. Note that as mentioned above, the transform unit is present in encoders. The inverse transform unit is present in the return decoding path of an encoder and in the decoding path of a decoder.

The transform unit and the inverse transform unit are intended to provide complementary transformations to and from the spatial frequency domain. That is to say, the transform unit 340 acts on sets of video data (or data derived from video data, such as the difference or residual data discussed above) and generates corresponding sets of spatial frequency coefficients. The inverse transform unit 430 acts on sets of spatial frequency coefficients and generates corresponding sets of video data.

In practice the transformations are implemented as matrix calculations. The forward transform is defined by a transformation matrix and the transformation is implemented by matrix-multiplying the transformation matrix by an array of sample values to generate a corresponding array of spatial frequency coefficients. In some examples, the array of samples, M, is left-multiplied by the transformation matrix T, and then the result is right-multiplied by the transpose of the transformation matrix, $T^T$. So the array of output coefficients is defined as $$T.M.T^T$$

A property of the type of matrix which represents a spatial frequency transformation of this type is that the transpose of the matrix is the same as its inverse. So, in principle the forward and inverse transformation matrices are related by a simple transposition.

In the proposed VVC specification, as it exists at the date of filing of the present application (see reference above), the transformations are defined only as inverse transformation matrices used in the decoder function. The encoder transformation matrices are not defined as such. The decoder (inverse) transformations are defined to a six bit precision.

As mentioned above, in principle a suitable set of forward (encoder) matrices could be obtained as the transposition of the inverse matrices. However, the relationship between the forward and inverse matrices applies only if the values are expressed to infinite precision. Expressing the values to a limited precision, such as six bits, means that the transposition is not necessarily an appropriate relationship between the forward and inverse matrices.

It is recognized that fabricating or implementing integer-arithmetic transform and inverse transform units can be easier, cheaper, faster and/or less processor-intensive than implementing similar units using floating point calculations. Accordingly, the matrix coefficients to be discussed below are expressed as integers, scaled up from the actual values required to implement the transform by a number of bits (powers of 2) sufficient to allow for the required coefficient precision. If required, the scaling-up can be removed by a bit shift (division by a number of powers of 2) at another stage in the process. In other words, the actual transformation coefficients are proportional to the values to be discussed below.

Provision of Transform Matrices

FIG. 9 schematically illustrates an example of the (forward) transform unit 340 or the inverse transform unit 430 and comprises a matrix data store 900 which stores appropriate data (see below) from which transform matrices (or, in other embodiments, inverse transform matrices) are derived by a matrix generator 910, for example in response to one or more of the current video data bit depth, the current block size and the type of transform in use.

The generated matrices are provided to a matrix processor 920 which performs the matrix multiplication associated with the required transform (or inverse transform), acting upon a block 930 to be processed in order to generate a processed block 940. In the case of a forward transform, the block 930 to be processed would be, for example, residual data from the subtraction stage 310, with the processed block 940 being provided to the quantisation stage 350. In the case of an inverse transform, the block 930 to be processed would be, for example, and inverse-quantised block output by the inverse quantiser 420 and the processed block 940 would be provided to the adder 450.

Transform Tools

In some example video data processing systems, various transform tools are available for selection, either individually or as successive multiple transforms. Examples of these transform tools include the discrete cosine transform (DCT) type II (DCT2); the DCT type VIII (DCT8) and the discrete sine transform (DST) type VII (DST7). Other example tools are available but will not be detailed here.

Selection between the tools can be by various techniques, such as any one or more of (i) a direct mapping between any one of a set of parameters including, for example, block size, prediction direction, prediction type (intra-, inter-) or the like, (ii) the results of one or more trial encoding processes, (iii) configuration data provided by a parameter set or otherwise, (iv) configuration is carried over from adjacent or temporarily preceding blocks, slices or other regions, (v) a predetermined configuration setting, or the like.

Whatever technique is used to select a transform tool, this is not significant to the teaching of the present disclosure which relates to the generation of matrix coefficients to implement a given transform.

Increased-Precision Forward Transform Matrices

This section, read in conjunction with the discussion above, discusses video data encoding methods and apparatus for encoding an array of video data values using forward transform matrices at a level of precision of for example, 14 bits.

The basis of this discussion is that improved results can be obtained by using forward matrices, matched to standard inverse matrices, which have coefficients expressed to a higher resolution than six bits. This is particularly the case where the system is encoding high bit depth video data (that is, video data having a large "bit depth" or data precision expressed as a number of bits, for example 16 bit video data).

The matrix values to be discussed below are applicable, for example, to frequency-transforming the video data values according to a frequency transform, to generate an array of frequency-transformed values by a matrix-multiplication process using a transform matrix having a data precision greater than six bits, the transform matrix having coefficients defined by at least a subset of the values discussed below, and to a frequency transform unit such as the unit 340) which performs such operations.

DCT2 Matrices

FIGS. 10a to 10e collectively define a 64×64 base matrix $M_{64}$ for DCT2. In particular, FIG. 10a indicates the relative configuration of four matrix portions shown respectively in FIGS. 10b-10e. FIG. 11 indicates values and alternate naming protocols for the coefficients; here, the left-hand column of names (a . . . E) are used for matrix sizes up to 32×32, and where a 64×64 matrix is required, the second column of names are used. The "14 bit" values in the third column are those provided as part of the present disclosure. The corresponding "6 bit" values are previously proposed values provided for comparison purposes only.

In general, for an N×N transform where N is 2, 4, 8 or 16, the 64×64 transform matrix $M_{64}$ is subsampled to select a subset of N×N values, the subset $M_N[x][y]$ of values being defined by:

$M_N[x][y]=M_{64}[x][(2^{(6-log\ 2(N))})y]$ for $x,y=0 \ldots (N-1)$.

Therefore operation of the arrangement of FIG. 7, operating in accordance with FIG. 9 and using the data of FIGS. 10a-10e and 11 provides an example of a video data encoding method for encoding an array of video data values, the method comprising the steps of:

frequency-transforming the video data values according to a frequency transform, to generate an array of frequency-transformed values by a matrix-multiplication process using a transform matrix having a data precision of fourteen bits, the frequency transform being a discrete cosine transform;

defining a 64×64 transform matrix $M_{64}$ for a 64×64 DCT transform, the matrix $M_{64}$ being defined by the accompanying FIGS. 10a-10e and 11;

for an N×N transform where N is 2, 4, 8 or 16, subsampling the 64×64 transform matrix $M_{64}$ to select a subset of N×N values, the subset $M_N[x][y]$ of values being defined by:

$M_N[x][y]=M_{64}[x][(2^{(6-log\ 2(N))})y]$ for $x,y=0 \ldots (N-1)$.

Similarly, the arrangement of FIGS. 7 and 9 operating as described, provides an example of data encoding apparatus for encoding an array of video data values, the apparatus comprising:

frequency transform circuitry configured to frequency-transform the video data values according to a frequency transform, to generate an array of frequency-transformed values by a matrix-multiplication process using a transform matrix having a data precision of fourteen bits, the frequency transform being a discrete cosine transform, the frequency transform circuitry defining a 64×64 transform matrix $M_{64}$ for a 64×64 DCT transform, the matrix $M_{64}$ being defined by the accompanying FIGS. 10a-10e and 11 in which for an N×N transform where N is 2, 4, 8 or 16, the N×N transform matrix comprises a subset of the 64×64 transform matrix $M_{64}$, the subset $M_N[x][y]$ of values being defined by:

$M_N[x][y]=M_{64}[x][(2^{(6-log\ 2(N))})y]$ for $x,y=0 \ldots (N-1)$.

Applying the relationship defined by the formula given above provides the following examples.

2×2 DCT2

The matrix $M_2$ is defined as the first two coefficients of every 32$^{th}$ row in the combined matrix $M_{64}$.

$$\begin{vmatrix} a & a \\ a & -a \end{vmatrix}$$

4×4 DCT2

The matrix $M_4$ is defined as the first four coefficients of every 16$^{th}$ row in the combined matrix $M_{64}$.

$$\begin{vmatrix} a & a & a & a \\ b & c & -c & -b \\ a & -a & -a & a \\ c & -b & b & -c \end{vmatrix}$$

8×8 DCT2

The matrix $M_8$ is defined as the first 8 coefficients of every $8^{th}$ row in the combined matrix $M_{64}$.

```
|a   a   a   a   a   a   a   a |
|d   e   f   g  -g  -f  -e  -d |
|b   c  -c  -b  -b  -c   c   b |
|e  -g  -d  -f   f   d   g  -e |
|a  -a  -a   a   a  -a  -a   a |
|f  -d   g   e  -e  -g   d  -f |
|c  -b   b  -c  -c   b  -b   c |
|g  -f   e  -d   d  -e   f  -g |
```

16×16 DCT2

The matrix $M_{16}$ is defined as the first 16 coefficients of every $4^{th}$ row in the combined matrix $M_{64}$.

```
|a   a   a   a   a   a   a   a   a   a   a   a   a   a   a   a |
|h   i   j   k   l   m   n   o  -o  -n  -m  -l  -k  -j  -i  -h |
|d   e   f   g  -g  -f  -e  -d  -d  -e  -f  -g   g   f   e   d |
|i   l   o  -m  -j  -h  -k  -n   n   k   h   j   m  -o  -l  -i |
|b   c  -c  -b  -b  -c   c   b   b   c  -c  -b  -b  -c   c   b |
|j   o  -k  -i  -n   l   h   m  -m  -h  -l   n   i   k  -o  -j |
|e  -g  -d  -f   f   d   g  -e  -e   g   d   f  -f  -d  -g   e |
|k  -m  -i   o   h   n  -j  -l   l   j  -n  -h  -o   i   m  -k |
|a  -a  -a   a   a  -a  -a   a   a  -a  -a   a   a  -a  -a   a |
|l  -j  -n   h  -o  -i   m   k  -k  -m   i   o  -h   n   j  -l |
|f  -d   g   e  -e  -g   d  -f  -f   d  -g  -e   e   g  -d   f |
|m  -h   l   n  -i   k   o  -j   j  -o  -k   i  -n  -l   h  -m |
|c  -b   b  -c  -c   b  -b   c   c  -b   b  -c  -c   b  -b   c |
|n  -k   h  -j   m   o  -l   i  -i   l  -o  -m   j  -h   k  -n |
|g  -f   e  -d   d  -e   f  -g  -g   f  -e   d  -d   e  -f   g |
|o  -n   m  -l   k  -j   i  -h   h  -i   j  -k   l  -m   n  -o |
```

32×32 DCT2

The matrix $M_{32}$ is defined as the first 32 coefficients of every $2^{nd}$ row in the combined matrix $M_{64}$.

```
|a   a   a   a   a   a   a   a   a   a   a   a   a   a   a   a   a   a   a   a   a   a   a   a   a   a   a   a   a   a   a   a |
|p   q   r   s   t   u   v   w   x   y   z   A   B   C   D   E  -E  -D  -C  -B  -A  -z  -y  -x  -w  -v  -u  -t  -s  -r  -q  -p |
|h   i   j   k   l   m   n   o  -o  -n  -m  -l  -k  -j  -i  -h  -h  -i  -j  -k  -l  -m   n  -o   o   n   m   l   k   j   i   h |
|q   t   w   z   C  -E  -B  -y  -v  -s  -p  -r  -u  -x  -A  -D   D   A   x   u   r   p   s   v   y   B   E  -C  -z  -w  -t  -q |
|d   e   f   g  -g  -f  -e  -d  -d  -e  -f  -g   g   f   e   d   d   e   f   g  -g  -f  -e  -d  -d  -e  -f  -g   g   f   e   d |
|r   w   B  -D  -y  -t  -p  -u  -z  -E   A   v   q   s   x   C  -C  -x  -s  -q  -v  -A   E   z   u   p   t   y   D  -B  -w  -r |
|i   l   o  -m  -j  -h  -k  -n   n   k   h   j   m  -o  -l  -i  -i  -l  -o   m   j   h   k   n  -n  -k  -h  -j  -m   o   l   i |
|s   z  -D  -w  -p  -v  -C   A   t   r   y  -E  -x  -q  -u   B-  B   u   q   x   E  -y  -r  -t  -A   C   v   p   w   D  -z  -s |
|b   c  -c  -b  -b  -c   c   b   b   c  -c  -b  -b  -c   c   b   b   c  -c  -b  -b  -c   c   b   b   c  -c  -b  -b  -c   c   b |
|t   C  -y  -p  -x   D   u   s   B  -z  -q  -w   E   v   r   A  -A  -r  -v  -E   w   q   z  -B  -s  -u  -D   x   p   y  -C  -t |
|j   o  -k  -i  -n   l   h   m  -m  -h  -l   n   i   k  -o  -j  -j  -o   k   i   n  -l  -h  -m   m   h   l  -n  -i  -k   o   j |
|u  -E  -t  -v   D   s   w  -C  -r  -x   B   q   y  -A  -p  -z   z   p   A  -y  -q  -B   x   r   C  -w  -s  -D   v   t   E  -u |
|e  -g  -d  -f   f   d   g  -e  -e   g   d   f  -f  -d  -g   e   e  -g  -d  -f   f   d   g  -e  -e   g   d   f  -f  -d  -g   e |
|v  -B  -p  -C   u   w  -A  -q  -D   t   x  -z  -r  -E   s   y  -y  -s   E   r   z  -x  -t   D   q   A  -w  -u   C   p   B  -v |
|k  -m  -i   o   h   n  -j  -l   l   j  -n  -h  -o   i   m  -k  -k   m   i  -o  -h  -n   j   l  -l  -j   n   h   o  -i  -m   k |
|w  -y  -u   A   s  -C  -q   E   p   D  -r  -B   t   z  -v  -x   x   v  -z  -t   B   r  -D  -p  -E   q   C  -s  -A   u   y  -w |
|a  -a  -a   a   a  -a  -a   a   a  -a  -a   a   a  -a  -a   a   a  -a  -a   a   a  -a  -a   a   a  -a  -a   a   a  -a  -a   a |
|x  -v  -z   t   B  -r  -D   p  -E  -q   C   s  -A  -u   y   w  -w  -y   u   A  -s  -C   q   E  -p   D   r  -B  -t   z   v  -x |
|l  -j  -n   h  -o  -i   m   k  -k  -m   i   o  -h   n   j  -l  -l   j   n  -h   o   i  -m  -k   k   m  -i  -o   h  -n  -j   l |
|y  -s  -E   r  -z  -x   t   D  -q   A   w  -u  -C   p  -B  -v   v   B  -p   C   u  -w  -A   q  -D  -t   x   z  -r   E   s  -y |
|f  -d   g   e  -e  -g   d  -f  -f   d  -g  -e   e   g  -d   f   f  -d   g   e  -e  -g   d  -f  -f   d  -g  -e   e   g  -d   f |
|z  -p   A   y  -q   B   x  -r   C   w  -s   D   v  -t   E   u  -u  -E   t  -v  -D   s  -w  -C   r  -x  -B   q  -y  -A   p  -z |
|m  -h   l   n  -i   k   o  -j   j  -o  -k   i  -n  -l   h  -m  -m   h  -l  -n   i  -k  -o   j  -j   o   k  -i   n   l  -h   m |
|A  -r   v  -E  -w   q  -z  -B   s  -u   D   x  -p   y   C  -t   t  -C  -y   p  -x  -D   u  -s   B   z  -q   w   E  -v   r  -A |
|c  -b   b  -c  -c   b  -b   c   c  -b   b  -c  -c   b  -b   c   c  -b   b  -c  -c   b  -b   c   c  -b   b  -c  -c   b  -b   c |
|B  -u   q  -x   E   y  -r   t  -A  -C   v  -p   w  -D  -z   s  -s   z   D  -w   p  -v   C   A  -t   r  -y  -E   x  -q   u  -B |
|n  -k   h  -j   m   o  -l   i  -i   l  -o  -m   j  -h   k  -n  -n   k  -h   j  -m  -o   l  -i   i  -l   o   m  -j   h  -k   n |
|C  -x   s  -q   v  -A  -E   z  -u   p  -t   y  -D  -B   w  -r   r  -w   B   D  -y   t  -p   u  -z   E   A  -v   q  -s   x  -C |
|g  -f   e  -d   d  -e   f  -g  -g   f  -e   d  -d   e  -f   g   g  -f   e  -d   d  -e   f  -g  -g   f  -e   d  -d   e  -f   g |
|D  -A   x  -u   r  -p   s  -v   y  -B   E   C  -z   w  -t   q  -q   t  -w   z  -C  -E   B  -y   v  -s   p  -r   u  -x   A  -D |
|o  -n   m  -l   k  -j   i  -h   h  -i   j  -k   l  -m   n  -o  -o   n  -m   l  -k   j  -i   h  -h   i  -j   k  -l   m  -n   o |
|E  -D   C  -B   A  -z   y  -x   w  -v   u  -t   s  -r   q  -p   p  -q   r  -s   t  -u   v  -w   x  -y   z  -A   B  -C   D  -E |
```

DCT2 64×64

The 64×64 DCT2 uses the full matrix $M_{64}$.

DCT8 Matrices

FIG. 12 schematically illustrates a set of values for use in the generation of transform matrices for the DCT8 transform tool. As before, the "14 bit" column relates to the newly proposed values, with the "6 bit" values being provided simply for comparison with previously proposed arrangements.

The selection of values is performed as follows.

Operation of the arrangement of FIG. 7, operating in accordance with FIG. 9 and using the data of FIG. 12 provides an example of a video data encoding method for encoding an array of video data values, the method comprising the steps of:

frequency-transforming the video data values according to a frequency transform, to generate an array of frequency-transformed values by a matrix-multiplication process using a transform matrix having a data precision of fourteen bits, the frequency transform being a discrete cosine transform;

defining a set of values as shown in the accompanying FIG. 12;

for an N×N transform where N is 4, 8, 16 or 32, selecting values of the N×N transform matrix $M_N$ from the set of values, defined by:

(i) For a 4×4 DCT8 Transform:

$$\begin{vmatrix} a & b & c & d \\ b & 0 & -b & -b \\ c & -b & -d & a \\ d & -b & a & -c \end{vmatrix}$$

(ii) For an 8×8 DCT8 Transform:

$$\begin{vmatrix} A & b & c & d & e & f & g & H \\ B & e & h & -g & -d & -a & -c & -f \\ C & h & -e & -a & -f & g & b & D \\ D & -g & -a & -h & c & e & -f & -b \\ E & -d & -f & c & g & -b & -h & A \\ F & -a & g & e & -b & h & d & -c \\ G & -c & b & -f & -h & d & -a & e \\ H & -f & d & -b & a & -c & e & -g \end{vmatrix}$$

(iii) For a 16×16 DCT8 Transform $$\begin{vmatrix} A & B & c & d & e & f & g & h & i & j & k & l & m & n & o & p \\ B & E & h & k & n & 0 & -n & -k & -h & -e & -b & -b & -e & -h & -k & -n \\ C & H & m & -p & -k & -f & -a & -e & -j & -o & n & i & d & b & g & l \\ d & K & -p & -i & -b & -f & -m & n & g & a & h & o & -l & -e & -c & -j \\ e & N & -k & -b & -h & 0 & h & b & k & -n & -e & -e & -n & k & b & h \\ f & 0 & -f & -f & 0 & f & f & 0 & -f & -f & 0 & f & f & 0 & -f & -f \\ g & -n & -a & -m & h & f & -o & -b & -l & i & e & -p & -c & -k & j & d \\ h & -k & -e & n & b & 0 & -b & -n & e & k & -h & -h & k & e & -n & -b \\ i & -h & -j & g & k & -f & -l & e & m & -d & -n & c & o & -b & -p & a \\ j & -e & -o & a & -n & -f & i & k & -d & -p & b & -m & -g & h & l & -c \\ k & -b & n & h & -e & 0 & e & -h & -n & b & -k & -k & b & -n & -h & e \\ l & -b & i & o & -e & f & -p & -h & c & -m & -k & a & -j & -n & d & -g \\ m & -e & d & -l & -n & f & -c & k & o & -g & b & -j & -p & h & -a & i \\ n & -h & b & -e & k & 0 & -k & e & -b & h & -n & -n & h & -b & e & -k \\ o & -k & g & -c & b & -f & j & -n & -p & l & -h & d & -a & e & -i & m \\ p & -n & l & -j & h & -f & d & -b & a & -c & e & -g & i & -k & m & -o \end{vmatrix}$$

(iv) For a 32×32 DCT8 Transform:

$$\begin{vmatrix} a & b & c & d & e & f & g & h & i & j & k & l & m & n & o & p & q & r & s & t & u & v & w & x & y & z & A & B & C & D & E & F \\ b & e & h & k & n & q & t & w & z & C & F & -E & -B & -y & -v & -s & -p & -m & -j & -g & -d & -a & -c & -f & -i & -l & -o & -r & -u & -x & -A & -D \\ c & h & m & r & w & B & 0 & -B & -w & -r & -m & -h & -c & -c & -h & -m & -r & -w & -B & 0 & B & w & r & m & h & c & c & h & m & r & w & B \\ d & k & r & y & F & -A & -t & -m & -f & -b & -i & -p & -w & -D & C & v & o & h & a & g & n & u & B & -E & -x & -q & -j & -c & -e & -l & -s & -z \\ e & n & w & F & -y & -p & -g & -c & -l & -u & D & A & r & i & a & j & s & B & -C & -t & -k & -b & -h & -q & -z & E & v & m & d & f & o & x \\ f & q & B & -A & -p & -e & -g & -r & -C & z & o & d & h & s & D & -y & -n & -c & -i & -t & -E & x & m & b & j & u & F & -w & -l & -a & -k & -v \\ g & t & 0 & -t & -g & -g & -t & 0 & t & g & g & t & 0 & -t & -g & -g & -t & 0 & t & g & g & t & 0 & -t & -g & -g & -t & 0 & t & g & g & t \\ h & w & -B & -m & -c & -r & 0 & r & c & m & B & -w & -h & -h & -w & B & m & c & r & 0 & -r & -c & -m & -B & w & h & h & w & -B & -m & -c & -r \\ i & z & -w & -f & -l & -C & t & c & o & F & -q & -a & -r & E & n & d & u & -B & -k & -g & -x & y & h & j & A & -v & -e & -m & -D & s & b & p \\ j & C & -r & -b & -u & z & g & m & F & -o & -e & -x & w & d & p & -E & -l & -h & -A & t & a & s & -B & -i & -k & -D & q & c & v & -y & -f & -n \\ k & F & -m & -i & -D & o & g & B & -q & -e & -z & s & c & x & -u & -a & -v & w & b & t & -y & -d & -r & A & f & p & -C & -h & -n & E & j & l \\ l & -E & -h & -p & A & d & t & -w & -a & -x & s & e & B & -o & -i & -F & k & m & -D & -g & -q & z & c & u & -v & -b & -y & r & f & C & -n & -j \\ m & -B & -c & -w & r & h & 0 & -h & -r & w & c & B & -m & -m & B & c & w & -r & -h & 0 & h & r & -w & -c & -B & m & m & -B & -c & -w & r & h \\ n & -y & -c & -D & i & s & -t & -h & E & d & x & -o & -m & z & b & C & -j & -r & u & g & -F & -e & -w & p & l & -A & -a & -B & k & q & -v & -f \\ o & -v & -h & C & a & D & -g & -w & n & p & -u & -i & B & b & E & -f & -x & m & q & -t & -j & A & c & F & -e & -y & l & r & -s & -k & z & d \\ p & -s & -m & v & j & -y & -g & B & d & -E & -a & -F & c & C & -f & -z & i & w & -l & -t & o & q & -r & -n & u & k & -x & -h & A & e & -D & -b \\ q & -p & -r & o & s & -n & -t & m & u & -l & -v & k & w & -j & -x & i & y & -h & -z & g & A & -f & -B & e & C & -d & -D & c & E & -b & -F & a \\ r & -m & -w & h & B & -c & 0 & c & -B & -h & w & m & -r & -r & m & w & -h & B & c & 0 & -c & B & h & -w & -m & r & r & -m & -w & h & B & -c \\ s & -j & -B & a & -C & -i & t & r & -k & -A & b & -D & -h & u & q & -l & -z & c & -E & -g & v & p & -m & -y & d & -F & -f & w & o & -n & -x & e \\ t & -g & 0 & g & -t & -t & g & 0 & -g & t & t & -g & 0 & g & -t & -t & g & 0 & -g & t & t & -g & 0 & g & -t & -t & g & 0 & -g & t & t & -g \\ u & -d & B & n & -k & -E & g & -r & -x & a & -y & -q & h & -F & -j & o & A & -c & v & t & -e & C & m & -l & -D & f & -s & -w & b & -z & -p & i \\ v & -a & w & u & -b & x & t & -c & y & s & -d & z & r & -e & A & q & -f & B & p & -g & C & o & -h & D & n & -i & E & m & -j & F & l & -k \\ w & -c & r & B & -h & m & 0 & -m & h & -B & -r & c & -w & -w & c & -r & -B & h & -m & 0 & m & -h & B & r & -c & w & w & -c & r & B & -h & m \\ x & -f & m & -E & -q & b & -t & -B & j & -i & A & u & -c & p & F & -n & e & -w & -y & g & -l & D & r & -a & s & C & -k & h & -z & -v & d & -o \\ y & -i & h & -x & -z & j & -g & w & A & -k & f & -v & -B & l & -e & u & C & -m & d & -t & -D & n & -c & s & E & -o & b & -r & -F & p & -a & q \\ z & -l & c & -q & E & u & -g & h & -v & -D & p & -b & m & -A & -y & k & -d & r & -F & -t & f & -i & w & C & -o & a & -n & B & x & -j & e & -s \\ A & -o & c & -j & v & F & -t & h & -e & q & -C & -y & m & -a & l & -x & -D & r & -f & g & -s & E & w & -k & b & -n & z & B & -p & d & -i & u \\ B & -r & h & -c & m & -w & 0 & w & -m & c & -h & r & -B & -B & r & -h & c & -m & w & 0 & -w & m & -c & h & -r & B & B & -r & h & -c & m & -w \\ C & -u & m & -e & d & -l & t & -B & -D & v & -n & f & -c & k & -s & A & E & -w & o & -g & b & -j & r & -z & -F & x & -p & h & -a & i & -q & y \\ D & -x & r & -l & f & -a & g & -m & s & -y & E & C & -w & q & -k & e & -b & h & -n & t & -z & F & B & -v & p & -j & d & -c & i & -o & u & -A \\ E & -A & w & -s & o & -k & g & -c & b & -f & j & -n & r & -v & z & -D & -F & B & -x & t & -p & l & -h & d & -a & e & -i & m & -q & u & -y & C \\ F & -D & B & -z & x & -v & t & -r & p & -n & l & -j & h & -f & d & -b & a & -c & e & -g & i & -k & m & -o & q & -s & u & -w & y & -A & C & -E \end{vmatrix}$$

Similarly, the arrangement of FIGS. 7 and 9 operating as described, provides an example of data encoding apparatus for encoding an array of video data values, the apparatus comprising:

frequency transform circuitry configured to frequency-transform the video data values according to a frequency transform, to generate an array of frequency-transformed values by a matrix-multiplication process using a transform matrix having a data precision of fourteen bits, the frequency transform being a discrete cosine transform, the frequency transform circuitry defining a set of values as shown in the accompanying FIG. 12, in which for an N×N transform where N is 4, 8, 16 or 32, the N×N transform matrix comprises selected values of the set of values defined by the subsets of values recited above.

DST7 Transform

FIG. 13 provides example data for use in the generation of DST7 transform matrices. As before, the "6 bit" columns are provided merely for comparison.

Operation of the arrangement of FIG. 7, operating in accordance with FIG. 9 and using the data of FIG. 13 provides an example of a video data encoding method for encoding an array of video data values, the method comprising the steps of:

frequency-transforming the video data values according to a frequency transform, to generate an array of frequency-transformed values by a matrix-multiplication process using a transform matrix having a data precision of fourteen bits, the frequency transform being a discrete sine transform;

defining a set of values as shown in the accompanying FIG. 13;

for an N×N transform where N is 4, 8, 16 or 32, selecting values of the N×N transform matrix $M_N$ from the set of values, defined by:

(i) For a 4×4 DST7 Transform $$\begin{vmatrix} a & b & c & d \\ c & c & 0 & -c \\ d & -a & -c & b \\ b & -d & c & -a \end{vmatrix}$$

(ii) For an 8×8 DST7 Transform $$\begin{vmatrix} a & B & c & d & e & f & g & h \\ c & F & h & e & b & -a & -d & -g \\ e & G & b & -c & -h & -d & a & f \\ g & C & -d & -f & a & h & b & -e \\ h & -a & -g & b & f & -c & -e & d \\ f & -e & -a & g & -d & -b & h & -c \\ d & -h & e & -a & -c & g & -f & b \\ b & -d & f & -h & g & -e & c & -a \end{vmatrix}$$

(iii) For a 16×16 DST7 Transform $$\begin{vmatrix} a & b & C & d & e & f & g & h & i & j & k & l & m & n & o & p \\ c & f & l & l & o & o & l & i & f & c & 0 & -c & -f & -i & -l & -o \\ e & j & O & m & h & c & -b & -g & -l & -p & -k & -f & -a & d & i & n \\ g & n & L & e & -b & -i & -p & -j & -c & d & k & o & h & a & -f & -m \\ i & o & F & -c & -l & -l & -c & f & o & i & 0 & -i & -o & -f & c & l \\ k & k & 0 & -k & -k & 0 & k & k & 0 & -k & -k & 0 & k & k & 0 & -k \\ m & g & -f & -n & -a & l & h & -e & -o & -b & k & i & -d & -p & -c & j \\ o & c & -l & -f & i & i & -f & -l & c & o & 0 & -o & -c & l & f & -i \\ p & -a & -o & b & n & -c & -m & d & l & -e & -k & f & j & -g & -i & h \\ n & -e & -i & j & d & -o & a & m & -f & -h & k & c & -p & b & l & -g \\ l & -i & -c & o & -f & -f & o & -c & -i & l & 0 & -l & i & c & -o & f \\ j & -m & C & g & -p & f & d & -n & i & a & -k & l & -b & -h & o & -e \\ h & -p & l & -a & -g & o & -j & b & f & -n & k & -c & -e & m & -l & d \\ f & -l & O & -i & c & c & -i & o & -l & f & 0 & -f & l & -o & i & -c \\ d & -h & L & -p & m & -i & e & -a & -c & g & -k & o & -n & j & -f & b \\ b & -d & F & -h & j & -l & n & -p & o & -m & k & -i & g & -e & c & -a \end{vmatrix}$$

(iv) For a 32×32 DST7 Transform

```
a   b   c   d   e   f   g   h   i   j   K   l   m   n   o   p   q   r   s   t   u   v   w   x   y   z   A   B   C   D   E   F
c   f   i   l   o   r   u   x   A   D   F   C   z   w   t   q   n   k   h   e   b  -a  -d  -g  -j  -m  -p  -s  -v  -y  -B  -E
e   j   o   t   y   D   D   y   t   o   j   e   0  -e  -j  -o  -t  -y  -D  -D  -y  -t  -o   j  -e   0   e   j   o   t   y   D
g   n   u   B   D   w   p   i   b  -e  -l  -s  -z  -F  -y  -r  -k  -d   c   j   q   x   E   A   t   m   f  -a  -h  -o  -v  -C
i   r   A   C   t   k   b  -g  -p  -y  -E  -v  -m  -d   e   n   w   F   x   o   f  -c  -l  -u  -D  -z  -q  -h   a   j   s   B
k   v   F   u   j  -a  -l  -w  -E  -t  -i   b   m   x   D   s   h  -c  -n  -y  -C  -r  -g   d   o   z   B   q   f  -e  -p  -A
m   z   z   m   0  -m  -z  -z  -m   0   m   z   z   m   0  -m  -z  -z  -m   0   m   z   z   m   0  -m  -z  -z  -m   0   m   z
o   D   t   e  -j  -y  -y  -j   e   t   D   o   0  -o  -D  -t  -e   j   y   y   j  -e  -t  -D  -o   0   o   D   t   e  -j  -y
q   E   n  -c  -t  -B  -k   f   w   y   h  -i  -z  -v  -e   l   C   s   b  -o  -F  -p   a   r   D   m  -d  -u  -A  -j   g   x
s   A   h  -k  -D  -p   c   v   x   e  -n  -F  -m   f   y   u   b  -q  -C  -j   i   B   r  -a  -t  -z  -g   l   E   o  -d  -w
u   w   b  -s  -y  -d   q   A   f  -o  -C  -h   m   E   j  -k  -F  -l   i   D   n  -g  -B  -p   e   z   r  -c  -x  -t   a   v
w   s  -d  -A  -o   h   E   k  -l  -D  -g   p   z   c  -t  -v   a   x   r  -e  -B  -n   i   F   j  -m  -C  -f   q   y   b  -u
y   o  -j  -D  -e   t   t  -e  -D  -j   o   y   0  -y  -o  -j   D   e  -t  -t   e   D   j  -o  -y   0   y   o  -j  -D  -e   t
A   k  -p  -v   e   F   f  -u  -q   j   B   a  -z  -l   o   w  -d  -E  -g   t   r  -i  -C  -b   y   m  -n  -x   c   D   h  -s
C   g  -v  -n   o   u  -h  -B   a   D   f  -w  -m   p   t  -i  -A   b   E   e  -x  -l   q   s  -j  -z   c   F   d  -y  -k   r
E   c  -B  -f   y   i  -v  -l   s   o  -p  -r   m   u  -j  -x   g   A  -d  -D   a   F   b  -C  -e   z   h  -w  -k   t   n  -q
F  -a  -E   b   D  -c  -C   d   B  -e  -A   f   z  -g  -y   h   x  -i  -w   j   v  -k  -u   l   t  -m  -s   n   r  -o  -q   p
D  -e  -y   j   t  -o  -o   t   j  -y  -e   D   0  -D   e   y  -j  -t   o   o  -t  -j   y   e  -D   0   D  -e  -y   j   t  -o
B  -i  -s   r   j  -A  -a   C  -h  -t   q   k  -z  -b   D  -g  -u   p   l  -y  -c   E  -f  -v   o   m  -x  -d   F  -e  -w   n
z  -m  -m   z   0  -z   m   m  -z   0   z  -m  -m   z   0  -z   m   m  -z   0   z  -m  -m   z   0  -z   m   m  -z   0   z  -m
x  -q  -g   E  -j  -n   A  -c  -u   t   d  -B   m   k  -D   f  -w  -a   y  -p  -h   F  -i  -o   z  -b  -v   s   e  -C   l
v  -u  -a   w  -t  -b   x  -s  -c   y  -r  -d   z  -q  -e   A  -p  -f   B  -o  -g   C  -n  -h   D  -m  -i   E  -l  -j   F  -k
t  -y   e   o  -D   j   j  -D   o   e  -y   t   0  -t   y  -e  -o   D  -j  -j   D  -o  -e   y  -t   0   t  -y   e   o  -D   j
r  -C   k   g  -y   v  -d  -n   F  -o  -c   u  -z   h   j  -B   s  -a  -q   D  -l  -f   x  -w   e   m  -E   p   b  -t   A  -i
p  -F   q  -a  -o   E  -r   b   n  -D   s  -c  -m   C  -t   d   l  -B   u  -e  -k   A  -v   f   j  -z   w  -g  -i   y  -x   h
n  -B   w  -i  -e   s  -F   r  -d  -j   x  -A   m   a  -o   C  -v   h   f  -t   E  -q   c   k  -y   z  -l  -b   p  -D   u  -g
l  -x   C  -q   e   g  -s   E  -v   j   b  -n   z  -A   o  -c  -i   u  -F   t  -h  -d   p  -B   y  -m   a   k  -w   D  -r   f
j  -t   D  -y   o  -e  -e   o  -y   D  -t   j   0  -j   t   D   y  -o   e   e  -o   y  -D   t  -j   0   j  -t   D  -y   o  -e
h  -p   x  -F   y  -q   i  -a  -g   o  -w   E  -z   r  -j   b   f  -n   v  -D   A  -s   k  -c  -e   m  -u   C  -B   t  -l   d
f  -l   r  -x   D  -C   w  -q   k  -e  -a   g  -m   s  -y   E  -B   v  -p   j  -d  -b   h  -n   t  -z   F  -A   u  -o   i  -c
d  -h   l  -p   t  -x   B  -F   C  -y   u  -q   m  -i   e  -a  -c   g  -k   o  -s   w  -A   E  -D   z  -v   r  -n   i  -f   b
b  -d   f  -h   j  -l   n  -p   r  -t   v  -x   z  -B   D  -F   E  -C   A  -y   w  -u   s  -q   o  -m   k  -i   g  -e   c  -a
```

Similarly, the arrangement of FIGS. 7 and 9 operating as described, provides an example of data encoding apparatus for encoding an array of video data values, the apparatus comprising:

frequency transform circuitry configured to frequency-transform the video data values according to a frequency transform, to generate an array of frequency-transformed values by a matrix-multiplication process using a transform matrix having a data precision of fourteen bits, the frequency transform being a discrete sine transform, the frequency transform circuitry defining a set of values as shown in the accompanying FIG. 13, in which for an N×N transform where N is 4, 8, 16 or 32, the N×N transform matrix comprises selected values of the set of values recited above.

Flag Coding

Previous example arrangements aimed at operating with high bit depths have proposed a so-called "extended precision flag" as a parameter which can be set in connection with a video data stream. In some previous examples and effect of setting this flag was to allow a potential increase in the dynamic range used during calculation of forward and inverse spatial frequency transforms so as to increase the precision of transformed values passed from the transform unit through to the entropy encoder (in a forward direction). The flag may be encoded as part of the so-called sequence parameter set (SPS).

In example embodiments of the present disclosure, the extended precision flag could be provided among a set of one or more other flags, for example in the SPS. FIG. 14 provides an example of a hierarchy of such flags, including a high bit depth control flag. If that flag is not set then the extended precision flag is not available but if that flag is set, then the extended precision flag may be set or unset. The overall high bit depth control flag allows other functionality relating to high bit depth (for example with video data greater than 10 bits) operation (such as, at least in principle, a higher precision quantiser or an alternate coefficient coder for transform or non-transform blocks) to be switched on or off and so provides a mechanism for coding and enabling future encoding tool modifications.

FIG. 14b is a schematic flowchart illustrating a method of encoding video data values, the method comprising:

selectively encoding (at a step 1400) a high bit depth control flag and, when the high bit depth control flag is set to indicate high bit depth operation, selectively encoding an extended precision flag to indicate at least extended precision operation of a spatial frequency transform stage; and encoding (at a step 1410) the video data values according to a mode of operation defined by the encoded high bit depth control flag and, when encoded, the extended precision flag.

Similarly, at the decoding side, FIG. 14c is a schematic flowchart illustrating a method of decoding video data values, the method comprising:

selectively decoding (at a step 1420) a high bit depth control flag and, when the high bit depth control flag is set to indicate high bit depth operation, selectively decoding an extended precision flag to indicate at least extended precision operation of a spatial frequency transform stage.

decoding (at a step 1430) the video data values according to a mode of operation defined by the encoded high bit depth control flag and, when decoded, the extended precision flag.

The high bit depth control flag and (selectively) the extended precision flag may be encoded to or decoded from a sequence parameter set of a video data stream.

Therefore the apparatus of FIG. 7, operating in accordance with these methods, provides an example of data encoding apparatus for encoding video data values, the apparatus comprising:

a parameter encoder (343) configured to selectively encode a high bit depth control flag and, when the high bit depth control flag is set to indicate high bit depth operation, to selectively encode an extended precision flag to indicate at least extended precision operation of a spatial frequency transform stage; and an encoder (FIG. 7) configured to encode the video data values according to a mode of operation defined by the encoded high bit depth control flag and, when encoded, the extended precision flag.

Similarly, the apparatus of FIG. 7, operating in accordance with these methods, provides an example of data decoding apparatus for decoding video data values, the apparatus comprising:

a parameter decoder (343) configured to selectively decode a high bit depth control flag and, when the high bit depth control flag is set to indicate high bit depth operation, to selectively decode an extended precision flag to indicate at least extended precision operation of a spatial frequency transform stage; and a decoder (FIG. 7) configured to decode the video data values according to a mode of operation defined by the encoded high bit depth control flag and, when decoded, the extended precision flag.

Summary Method—Matrix Generation

Figure 15:
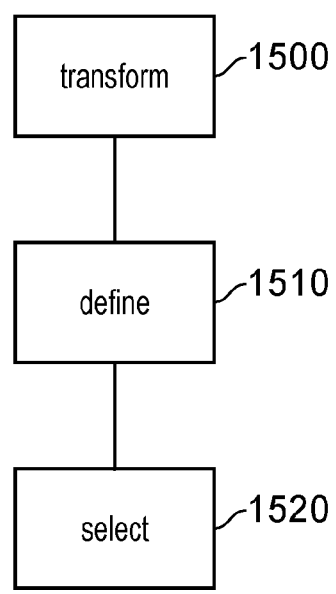

FIG. 15 is a schematic flowchart illustrating a method comprising frequency-transforming (at a step 1500) video data values according to a frequency transform, to generate an array of frequency-transformed values by a matrix-multiplication process using one or more of the transforms defined above;

defining (at a step 1510) a set of values as shown in the Figure relevant to that transform;

for an N×N transform, selecting (at a step 1520) values of the N×N transform matrix $M_N$ from the set of values provided, using the techniques discussed above.

Image Data

Image or video data encoded or decoded using these techniques and a data carrier which carries such image data are considered to represent an embodiment of the present disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Respective aspects and features are defined by the following numbered clauses:

1. A video data encoding method for encoding an array of video data values, the method comprising the steps of:

frequency-transforming the video data values according to a frequency transform, to generate an array of frequency-transformed values by a matrix-multiplication process using a transform matrix having a data precision of fourteen bits, the frequency transform being a discrete cosine transform;

defining a 64×64 transform matrix $M_{64}$ for a 64×64 DCT transform, the matrix $M_{64}$ being defined by the accompanying FIGS. 10a-10e and 11;

for an N×N transform where N is 2, 4, 8 or 16, subsampling the 64×64 transform matrix $M_{64}$ to select a subset of N×N values, the subset $M_N[x][y]$ of values being defined by:

$$M_N[x][y]=M_{64}[x][(2^{(6-\log 2(N))})y] \text{ for } x,y=0\ldots(N-1).$$

2. Image data encoded by the method of clause 1.

3. Computer software which, when executed by a computer, causes the computer to perform the method of clause 1.

4. A non-transitory machine-readable storage medium which stores the computer software of clause 3.

5. Data encoding apparatus for encoding an array of video data values, the apparatus comprising:

frequency transform circuitry configured to frequency-transform the video data values according to a frequency transform, to generate an array of frequency-transformed values by a matrix-multiplication process using a transform matrix having a data precision of fourteen bits, the frequency transform being a discrete cosine transform, the frequency transform circuitry defining a 64×64 transform matrix $M_{64}$ for a 64×64 DCT transform, the matrix $M_{64}$ being defined by the accompanying FIGS. 10a-10e and 11 in which for an N×N transform where N is 2, 4, 8 or 16, the N×N transform matrix comprises a subset of the 64×64 transform matrix $M_{64}$, the subset $M_N[x][y]$ of values being defined by:

$$M_N[x][y]=M_{64}[x][(2^{(6-\log_2(N))})y] \text{ for } x,y= 0 \ldots (N-1).$$

6. Video data capture, transmission, display and/or storage apparatus comprising the apparatus of clause 5.

7. A video data encoding method for encoding an array of video data values, the method comprising the steps of:
  frequency-transforming the video data values according to a frequency transform, to generate an array of frequency-transformed values by a matrix-multiplication process using a transform matrix having a data precision of fourteen bits, the frequency transform being a discrete cosine transform;
  defining a set of values as shown in the accompanying FIG. 12;
  for an N×N transform where N is 4, 8, 16 or 32, selecting values of the N×N transform matrix $M_N$ from the set of values, defined by:

(i) For a 4×4 DCT8 Transform:

$$\begin{vmatrix} a & b & c & d \\ b & 0 & -b & -b \\ c & -b & -d & a \\ d & -b & a & -c \end{vmatrix}$$

(ii) For an 8×8 DCT8 Transform:

$$\begin{vmatrix} A & b & c & d & e & f & g & H \\ B & e & h & -g & -d & -a & -c & -f \\ C & h & -e & -a & -f & g & b & D \\ D & -g & -a & -h & c & e & -f & -b \\ E & -d & -f & c & g & -b & -h & A \\ F & -a & g & e & -b & h & d & -c \\ G & -c & b & -f & -h & d & -a & e \\ H & -f & d & -b & a & -c & e & -g \end{vmatrix}$$

(iii) For a 16×16 DCT8 Transform $$\begin{vmatrix} A & B & c & d & e & f & g & h & i & j & k & l & m & n & o & p \\ B & E & h & k & n & 0 & -n & -k & -h & -e & -b & -b & -e & -h & -k & -n \\ C & H & m & -p & -k & -f & -a & -e & -j & -o & n & i & d & b & g & l \\ d & K & -p & -i & -b & -f & -m & n & g & a & h & o & -l & -e & -c & -j \\ e & N & -k & -b & -h & 0 & h & b & k & -n & -e & -e & -n & k & b & h \\ f & 0 & -f & -f & 0 & f & f & 0 & -f & -f & 0 & f & f & 0 & -f & -f \\ g & -n & -a & -m & h & f & -o & -b & -l & i & e & -p & -c & -k & j & d \\ h & -k & -e & n & b & 0 & -b & -n & e & k & -h & -h & k & e & -n & -b \\ i & -h & -j & g & k & -f & -l & e & m & -d & -n & c & o & -b & -p & a \\ j & -e & -o & a & -n & -f & i & k & -d & -p & b & -m & -g & h & l & -c \\ k & -b & n & h & -e & 0 & e & -h & -n & b & -k & -k & b & -n & -h & e \\ l & -b & i & o & -e & f & -p & -h & c & -m & -k & a & -j & -n & d & -g \\ m & -e & d & -l & -n & f & -c & k & o & -g & b & -j & -p & h & -a & i \\ n & -h & b & -e & k & 0 & -k & e & -b & h & -n & -n & h & -b & e & -k \\ o & -k & g & -c & b & -f & j & -n & -p & l & -h & d & -a & e & -i & m \\ p & -n & l & -j & h & -f & d & -b & a & -c & e & -g & i & -k & m & -o \end{vmatrix}$$

(iv) For a 32×32 DCT8 Transform

8. Image data encoded by the method of clause 7.
9. Computer software which, when executed by a computer, causes the computer to perform the method of clause 7.
10. A non-transitory machine-readable storage medium which stores the computer software of clause 9.
11. Data encoding apparatus for encoding an array of video data values, the apparatus comprising:
   frequency transform circuitry configured to frequency-transform the video data values according to a frequency transform, to generate an array of frequency-transformed values by a matrix-multiplication process using a transform matrix having a data precision of fourteen bits, the frequency transform being a discrete cosine transform, the frequency transform circuitry defining a set of values as shown in the accompanying FIG. 12, in which for an N×N transform where N is 4, 8, 16 or 32, the N×N transform matrix comprises selected values of the set of values defined by:
(i) For a 4×4 DCT8 Transform:

$$\begin{vmatrix} a & b & c & d \\ b & 0 & -b & -b \\ c & -b & -d & a \\ d & -b & a & -c \end{vmatrix}$$

(ii) For an 8×8 DCT8 Transform:

$$\begin{vmatrix} A & b & c & d & e & f & g & H \\ B & e & h & -g & -d & -a & -c & -f \\ C & h & -e & -a & -f & g & b & D \\ D & -g & -a & -h & c & e & -f & -b \\ E & -d & -f & c & g & -b & -h & A \\ F & -a & g & e & -b & h & d & -c \\ G & -c & b & -f & -h & d & -a & e \\ H & -f & d & -b & a & -c & e & -g \end{vmatrix}$$

(iii) For a 16×16 DCT8 Transform $$\begin{vmatrix} A & B & c & d & e & f & g & h & i & j & k & l & m & n & o & p \\ B & E & h & k & n & 0 & -n & -k & -h & -e & -b & -b & -e & -h & -k & -n \\ C & H & m & -p & -k & -f & -a & -e & -j & -o & n & i & d & b & g & l \\ d & K & -p & -i & -b & -f & -m & n & g & a & h & o & -l & -e & -c & -j \\ e & N & -k & -b & -h & 0 & h & b & k & -n & -e & -e & -n & k & b & h \\ f & 0 & -f & -f & 0 & f & f & 0 & -f & -f & 0 & f & f & 0 & -f & -f \\ g & -n & -a & -m & h & f & -o & -b & -l & i & e & -p & -c & -k & j & d \\ h & -k & -e & n & b & 0 & -b & -n & e & k & -h & -h & k & e & -n & -b \\ i & -h & -j & g & k & -f & -l & e & m & -d & -n & c & o & -b & -p & a \\ j & -e & -o & a & -n & -f & i & k & -d & -p & b & -m & -g & h & l & -c \\ k & -b & n & h & -e & 0 & e & -h & -n & b & -k & -k & b & -n & -h & e \\ l & -b & i & o & -e & f & -p & -h & c & -m & -k & a & -j & -n & d & -g \\ m & -e & d & -l & -n & f & -c & k & o & -g & b & -j & -p & h & -a & i \\ n & -h & b & -e & k & 0 & -k & e & -b & h & -n & -n & h & -b & e & -k \\ o & -k & g & -c & b & -f & j & -n & -p & l & -h & d & -a & e & -i & m \\ p & -n & l & -j & h & -f & d & -b & a & -c & e & -g & i & -k & m & -o \end{vmatrix}$$

(iv) For a 32×32 DCT8 Transform:

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| a | b | c | d | e | f | g | h | i | j | k | l | m | n | o | p | q | r | s | t | u | v | w | x | y | z | A | B | C | D | E | F |
| b | e | h | k | n | q | t | w | z | C | F | −E | −B | −y | −v | −s | −p | −m | −j | −g | −d | −a | −c | −f | −i | −l | −o | −r | −u | −x | −A | −D |
| c | h | m | r | w | B | 0 | −B | −w | −r | −m | −h | −c | −c | −h | −m | −r | −w | −B | 0 | B | w | r | m | h | c | c | h | m | r | w | B |
| d | k | r | y | F | −A | −t | −m | −f | −b | −i | −p | −w | −D | C | v | o | h | a | g | n | u | B | −E | −x | −q | −j | −c | −e | −l | −s | −z |
| e | n | w | F | −y | −p | −g | −c | −l | −u | −D | A | r | i | a | j | s | B | −C | −t | −k | −b | −h | −q | −z | E | v | m | d | f | o | x |
| f | q | B | −A | −p | −e | −g | −r | −C | z | o | d | h | s | D | −y | −n | −c | −i | −t | −E | x | m | b | j | u | F | −w | −l | −a | −k | −v |
| g | t | 0 | −t | −g | −g | −t | 0 | t | g | g | t | 0 | −t | −g | −g | −t | 0 | t | g | g | t | 0 | −t | −g | −g | −t | 0 | t | g | g | t |
| h | w | −B | −m | −c | −r | 0 | r | c | m | B | −w | −h | −h | −w | B | m | c | r | 0 | −r | −c | −m | −B | w | h | h | w | −B | −m | −c | −r |
| i | z | −w | −f | −l | −C | t | c | o | F | −q | −a | −r | E | n | d | u | −B | −k | −g | −x | y | h | j | A | −v | −e | −m | −D | s | b | p |
| j | C | −r | −b | −u | z | g | m | F | −o | −e | −x | w | d | p | −E | −l | −h | −A | t | a | s | −B | −i | −k | −D | q | c | v | −y | −f | −n |
| k | F | −m | −i | −D | o | g | B | −q | −e | −z | s | c | x | −u | −a | −v | w | b | t | −y | −d | −r | A | f | p | −C | −h | −n | E | j | l |
| l | −E | −h | −p | A | d | t | −w | −a | −x | s | e | B | −o | −i | −F | k | m | −D | −g | −q | z | c | u | −v | −b | −y | r | f | C | −n | −j |
| m | −B | −c | −w | r | h | 0 | −h | −r | w | c | B | −m | −m | B | c | w | −r | −h | 0 | h | r | −w | −c | −B | m | m | −B | −c | −w | r | h |
| n | −y | −c | −D | i | s | −t | −h | E | d | x | −o | −m | z | b | C | −j | −r | u | g | −F | −e | −w | p | l | −A | −a | −B | k | q | −v | −f |
| o | −v | −h | C | a | D | −g | −w | n | p | −u | −i | B | b | E | −f | −x | m | q | −t | −j | A | c | F | −e | −y | l | r | −s | −k | z | d |
| p | −s | −m | v | j | −y | −g | B | d | −E | −a | −F | c | C | −f | −z | i | w | −l | −t | o | q | −r | −n | u | k | −x | −h | A | e | −D | −b |
| q | −p | −r | o | s | −n | −t | m | u | −l | −v | k | w | −j | −x | i | y | −h | −z | g | A | −f | −B | e | C | −d | −D | c | E | −b | −F | a |
| r | −m | −w | h | B | −c | 0 | c | −B | −h | w | m | −r | −r | m | w | −h | −B | c | 0 | −c | B | h | −w | −m | r | r | −m | −w | h | B | −c |
| s | −j | −B | a | −C | −i | t | r | −k | −A | b | −D | −h | u | q | −l | −z | c | −E | −g | v | p | −m | −y | d | −F | −f | w | o | −n | −x | e |
| t | −g | 0 | g | −t | −t | g | 0 | −g | t | t | −g | 0 | g | −t | −t | g | 0 | −g | t | t | −g | 0 | g | −t | −t | g | 0 | −g | t | t | −g |
| u | −d | B | n | −k | −E | g | −r | −x | a | −y | −q | h | −F | −j | o | A | −c | v | t | −e | C | m | −l | −D | f | −s | −w | b | −z | −p | i |
| v | −a | w | u | −b | x | t | −c | y | s | −d | z | r | −e | A | q | −f | B | p | −g | C | o | −h | D | n | −i | E | m | −j | F | l | −k |
| w | −c | r | B | −h | m | 0 | −m | h | −B | −r | c | −w | −w | c | −r | −B | h | −m | 0 | m | −h | B | r | −c | w | w | −c | r | B | −h | m |
| x | −f | m | −E | −q | b | −t | −B | j | −i | A | u | −c | p | F | −n | e | −w | −y | g | −l | D | r | −a | s | C | −k | h | −z | −v | d | −o |
| y | −i | h | −x | −z | j | −g | w | A | −k | f | −v | −B | l | −e | u | C | −m | d | −t | −D | n | −c | s | E | −o | b | −r | −F | p | −a | q |
| z | −l | c | −q | E | u | −g | h | −v | −D | p | −b | m | −A | −y | k | −d | r | −F | −t | f | −i | w | C | −o | a | −n | B | x | −j | e | −s |
| A | −o | c | −j | v | F | −t | h | −e | q | −C | −y | m | −a | l | −x | −D | r | −f | g | −s | E | w | −k | b | −n | z | B | −p | d | −i | u |
| B | −r | h | −c | m | −w | 0 | w | −m | c | −h | r | −B | −B | r | −h | c | −m | w | 0 | −w | m | −c | h | −r | B | B | −r | h | −c | m | −w |
| C | −u | m | −e | d | −l | t | −B | −D | v | −n | f | −c | k | −s | A | E | −w | o | −g | b | −j | r | −z | −F | x | −p | h | −a | i | −q | y |
| D | −x | r | −l | f | −a | g | −m | s | −y | E | C | −w | q | −k | e | −b | h | −n | t | −z | F | B | −v | p | −j | d | −c | i | −o | u | −A |

12. Video data capture, transmission, display and/or storage apparatus comprising the apparatus of clause 11.

13. A video data encoding method for encoding an array of video data values, the method comprising the steps of:

frequency-transforming the video data values according to a frequency transform, to generate an array of frequency-transformed values by a matrix-multiplication process using a transform matrix having a data precision of fourteen bits, the frequency transform being a discrete sine transform;

defining a set of values as shown in the accompanying FIG. 13;

for an N×N transform where N is 4, 8, 16 or 32, selecting values of the N×N transform matrix $M_N$ from the set of values, defined by:

(i) For a 4×4 DST7 Transform $$\begin{vmatrix} a & b & c & d \\ c & c & 0 & -c \\ d & -a & -c & b \\ b & -d & c & -a \end{vmatrix}$$

(ii) for an 8×8 DST7 transform $$\begin{vmatrix} a & B & c & d & e & f & g & h \\ c & F & h & e & b & -a & -d & -g \\ e & G & b & -c & -h & -d & a & f \\ g & C & -d & -f & a & h & b & -e \\ h & -a & -g & b & f & -c & -e & d \\ f & -e & -a & g & -d & -b & h & -c \\ d & -h & e & -a & -c & g & -f & b \\ b & -d & f & -h & g & -e & c & -a \end{vmatrix}$$

(iii) For a 16×16 DST7 Transform $$\begin{vmatrix} a & b & C & d & e & f & g & h & i & j & k & l & m & n & o & p \\ c & f & l & l & o & o & l & i & f & c & 0 & -c & -f & -i & -l & -o \\ e & j & O & m & h & c & -b & -g & -l & -p & -k & -f & -a & d & i & n \\ g & n & L & e & -b & -i & -p & -j & -c & d & k & o & h & a & -f & -m \\ i & o & F & -c & -l & -l & -c & f & o & i & 0 & -i & -o & -f & c & l \\ k & k & 0 & -k & -k & 0 & k & k & 0 & -k & -k & 0 & k & k & 0 & -k \\ m & g & -f & -n & -a & l & h & -e & -o & -b & k & i & -d & -p & -c & j \\ o & c & -l & -f & i & i & -f & -l & c & o & 0 & -o & -c & l & f & -i \\ p & -a & -o & b & n & -c & -m & d & l & -e & -k & f & j & -g & -i & h \\ n & -e & -i & j & d & -o & a & m & -f & -h & k & c & -p & b & l & -g \\ l & -i & -c & o & -f & -f & o & -c & -i & l & 0 & -l & i & c & -o & f \\ j & -m & C & g & -p & f & d & -n & i & a & -k & l & -b & -h & o & -e \\ h & -p & l & -a & -g & o & -j & b & f & -n & k & -c & -e & m & -l & d \\ f & -l & O & -i & c & c & -i & o & -l & f & 0 & -f & l & -o & i & -c \\ d & -h & L & -p & m & -i & e & -a & -c & g & -k & o & -n & j & -f & b \\ b & -d & F & -h & j & -l & n & -p & o & -m & k & -i & g & -e & c & -a \end{vmatrix}$$

(iv) For a 32×32 DST7 Transform

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| F | −E | −D | −C | −B | −A | −z | −y | −x | −w | −v | −u | −t | −s | −r | −q | −p | −o | −n | −m | −l | −k | −j | −i | −h | −g | −f | −e | −d | −c | −b | −a |
| E | −D | −C | −B | −A | −z | −y | −x | −w | −v | −u | −t | −s | −r | −q | −p | −o | −n | −m | −l | −k | −j | −i | −h | −g | −f | −e | −d | −c | −b | −a | F |
| D | −C | −B | −A | −z | −y | −x | −w | −v | −u | −t | −s | −r | −q | −p | −o | −n | −m | −l | −k | −j | −i | −h | −g | −f | −e | −d | −c | −b | −a | F | E |
| C | −B | −A | −z | −y | −x | −w | −v | −u | −t | −s | −r | −q | −p | −o | −n | −m | −l | −k | −j | −i | −h | −g | −f | −e | −d | −c | −b | −a | F | E | D |
| B | −A | −z | −y | −x | −w | −v | −u | −t | −s | −r | −q | −p | −o | −n | −m | −l | −k | −j | −i | −h | −g | −f | −e | −d | −c | −b | −a | F | E | D | C |
| A | −z | −y | −x | −w | −v | −u | −t | −s | −r | −q | −p | −o | −n | −m | −l | −k | −j | −i | −h | −g | −f | −e | −d | −c | −b | −a | F | E | D | C | B |
| z | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| y | −j | −e | −a | −t | −o | −j | −e | −a | −t | −o | −j | −e | −a | −t | −o | −j | −e | −a | −t | −o | −j | −e | −a | −t | −o | −j | −e | −a | −t | −o | D |
| x | −g | −A | −u | −o | −i | −C | −v | −p | −j | −D | −x | −r | −l | −E | −y | −s | −m | −F | −z | −t | −n | −h | −B | −v | −p | −j | −D | −x | −r | −l | E |
| w | −d | −E | −o | −a | −B | −m | −x | −i | −t | −F | −q | −b | −C | −n | −y | −j | −u | −e | −D | −o | −z | −A | −k | −v | −f | −E | −p | −a | −B | −m | x |
| v | −a | −t | −x | −c | −r | −l | −e | −D | −i | −B | −g | −A | −F | −k | −E | −y | −c | −x | −r | −l | −e | −D | −i | −B | −g | −A | −F | −k | −E | −y | w |
| u | b | −y | −f | −m | −F | −i | −B | −e | −t | −n | −A | −t | −m | −F | −i | −B | −e | −t | −n | −A | −t | −m | −F | −i | −B | −e | −t | −n | −A | −t | v |
| t | e | −D | j | −o | −y | D | j | −e | −t | −D | j | o | −y | −D | j | o | −y | −D | j | o | −y | −D | j | o | −y | −D | j | o | −y | −D | u |
| s | h | −D | c | −n | −m | j | y | b | −C | −i | D | n | −e | −t | e | t | −D | j | o | −y | −D | j | o | −y | −D | j | o | −y | −D | j | t |
| r | k | −y | −d | j | −z | j | b | −q | −l | x | a | F | −w | −b | A | b | −w | −f | D | −a | −B | v | −C | A | E | −C | A | E | −C | A | s |
| q | n | −t | −k | w | h | −z | −e | j | C | b | −F | q | a | D | −d | −A | g | x | −j | −u | m | r | −p | −o | D | l | −i | u | h | −o | e |
| p | q | o | −r | n | s | −m | −t | l | u | −k | −F | −v | j | w | −i | −x | h | y | −g | −D | f | −e | A | −C | −v | −i | C | y | f | −B | F |
| o | t | −j | −y | e | D | 0 | −D | −e | y | j | −t | −o | t | j | −y | o | t | −D | e | D | 0 | −D | −e | y | E | A | o | t | −j | −D | F |
| n | w | −e | −F | −d | x | m | −o | −v | f | E | c | −h | −p | u | −g | −D | e | −w | −a | −o | −A | a | o | −r | s | −i | e | −B | D | −F | |
| m | z | 0 | −z | −m | z | 0 | −z | −m | z | 0 | −z | −m | z | 0 | −z | −m | z | 0 | −z | −m | z | 0 | −z | −m | z | 0 | −z | −m | z | | |
| l | C | e | −s | −v | b | m | z | o | −i | −F | −h | p | p | a | −w | −r | f | −d | k | −B | t | u | −c | −A | m | a | g | −q | −x | | |
| k | F | j | −l | −i | m | z | D | h | −n | −C | g | o | B | f | −p | −A | −e | q | z | −r | −y | −c | s | x | b | −a | −w | E | u | v | |
| j | D | o | −e | −y | −t | e | t | y | e | −o | −D | −j | D | o | −t | −y | 0 | e | t | −o | −D | j | D | o | −y | −t | 0 | e | t | −i | |
| i | A | −p | −y | t | b | −p | −E | −m | j | e | t | w | x | −f | −D | −q | −l | q | a | s | B | −e | −r | o | F | n | −d | r | −p | | |
| h | x | y | i | −g | −w | −z | −y | −j | −w | f | k | f | −e | −u | −B | a | s | d | −t | C | m | −c | −s | −D | o | −n | b | n | r | | |
| g | D | p | b | −l | −z | −y | −y | −k | f | c | v | E | k | −e | −u | −B | a | s | d | −t | C | m | −c | −s | −D | o | b | n | r | E | |
| f | r | k | D | w | b | t | j | 0 | −m | −y | −B | −p | c | −d | q | E | f | f | u | i | −n | A | −c | −s | −D | 0 | F | −r | −e | −s | |
| e | o | y | D | t | j | 0 | −j | −t | −D | −y | −e | v | e | o | o | t | y | D | 0 | −D | −y | −t | −o | −e | v | e | o | t | y | E | |
| d | l | B | C | u | m | −c | −k | −s | −A | −D | −v | −n | r | b | j | r | z | D | v | n | f | −d | w | o | g | −a | −q | −e | −g | −i | |
| c | i | o | A | F | z | −t | n | c | −h | b | −d | −j | −p | −v | −B | j | r | −y | −r | −p | D | k | d | k | C | w | x | r | −h | p | |
| b | f | r | v | z | D | E | A | w | s | o | k | g | c | −a | −e | −i | −m | −q | −u | −y | −C | −F | −B | −x | −t | −p | −l | −h | −d | −i | |
| a | c | e | g | i | k | m | o | q | s | u | w | y | A | C | E | F | D | B | z | x | v | t | r | p | n | l | j | h | f | d | b |

14. Image data encoded by the method of clause 13.

15. Computer software which, when executed by a computer, causes the computer to perform the method of clause 13.

16. A non-transitory machine-readable storage medium which stores the computer software of clause 15.

17. Data encoding apparatus for encoding an array of video data values, the apparatus comprising:

frequency transform circuitry configured to frequency-transform the video data values according to a frequency transform, to generate an array of frequency-transformed values by a matrix-multiplication process using a transform matrix having a data precision of fourteen bits, the frequency transform being a discrete sine transform, the frequency transform circuitry defining a set of values as shown in the accompanying FIG. 13, in which for an N×N transform where N is 4, 8, 16 or 32, the N×N transform matrix comprises selected values of the set of values defined by:

(i) For a 4×4 DST7 Transform $$\begin{vmatrix} a & b & c & d \\ c & c & 0 & -c \\ d & -a & -c & b \\ b & -d & c & -a \end{vmatrix}$$

(ii) For an 8×8 DST7 Transform $$\begin{vmatrix} a & B & c & d & e & f & g & h \\ c & F & h & e & b & -a & -d & -g \\ e & G & b & -c & -h & -d & a & f \\ g & C & d & -f & a & h & b & -e \\ h & -a & -g & b & f & -c & -e & d \\ f & -e & -a & g & -d & -b & h & -c \\ d & -h & e & -a & -c & g & -f & b \\ b & -d & f & -h & g & -e & c & -a \end{vmatrix}$$

(iii) For a 16×16 DST7 Transform $$\begin{vmatrix} a & b & C & d & e & f & g & h & i & j & k & l & m & n & o & p \\ c & f & l & l & o & o & l & i & f & c & 0 & -c & -f & -i & -l & -o \\ e & j & O & m & h & c & -b & -g & -l & -p & -k & -f & -a & d & i & n \\ g & n & L & e & -b & -i & -p & -j & -c & d & k & o & h & a & -f & -m \\ i & o & F & -c & -l & -l & -c & f & o & i & 0 & -i & -o & -f & c & l \\ k & k & 0 & -k & -k & 0 & k & k & 0 & -k & -k & 0 & k & k & 0 & -k \\ m & g & -f & -n & -a & l & h & -e & -o & -b & k & i & -d & -p & -c & j \\ o & c & -l & -f & i & i & -f & -l & c & o & 0 & -o & -c & l & f & -i \\ p & -a & -o & b & n & -c & -m & d & l & -e & -k & f & j & -g & -i & h \\ n & -e & -i & j & d & -o & a & m & -f & -h & k & c & -p & b & l & -g \\ l & -i & -c & o & -f & -f & o & -c & -i & l & 0 & -l & i & c & -o & f \\ j & -m & C & g & -p & f & d & -n & i & a & -k & l & -b & -h & o & -e \\ h & -p & l & -a & -g & o & -j & b & f & -n & k & -c & -e & m & -l & d \\ f & -l & O & -i & c & c & -i & o & -l & f & 0 & -f & l & -o & i & -c \\ d & -h & L & -p & m & -i & e & -a & -c & g & -k & o & -n & j & -f & b \\ b & -d & F & -h & j & -l & n & -p & o & -m & k & -i & g & -e & c & -a \end{vmatrix}$$

(iv) For a 32×32 DST7 Transform

18. Video data capture, transmission, display and/or storage apparatus comprising the apparatus of clause 17.

19. A method of encoding video data values, the method comprising:

selectively encoding a high bit depth control flag and, when the high bit depth control flag is set to indicate high bit depth operation, selectively encoding an extended precision flag to indicate at least extended precision operation of a spatial frequency transform stage; and encoding the video data values according to a mode of operation defined by the encoded high bit depth control flag and, when encoded, the extended precision flag.

20. The method of clause 19, comprising selectively encoding the high bit depth control flag and selectively encoding the extended precision flag to a sequence parameter set of a video data stream.

21. Computer software which, when executed by a computer, causes the computer to perform the method of clause 19.

22. A non-transitory machine-readable storage medium which stores the computer software of clause 21.

23. A method of decoding video data values, the method comprising:

selectively decoding a high bit depth control flag and, when the high bit depth control flag is set to indicate high bit depth operation, selectively decoding an extended precision flag to indicate at least extended precision operation of a spatial frequency transform stage.

decoding the video data values according to a mode of operation defined by the encoded high bit depth control flag and, when decoded, the extended precision flag.

24. The method of clause 23, comprising selectively decoding the high bit depth control flag and selectively encoding the extended precision flag from a sequence parameter set of a video data stream.

25. Computer software which, when executed by a computer, causes the computer to perform the method of clause 23.

26. A non-transitory machine-readable storage medium which stores the computer software of clause 25.

27. Data encoding apparatus for encoding video data values, the apparatus comprising:

a parameter encoder configured to selectively encode a high bit depth control flag and, when the high bit depth control flag is set to indicate high bit depth operation, to selectively encode an extended precision flag to indicate at least extended precision operation of a spatial frequency transform stage; and an encoder configured to encode the video data values according to a mode of operation defined by the encoded high bit depth control flag and, when encoded, the extended precision flag.

28. Video data capture, transmission, display and/or storage apparatus comprising the apparatus of clause 27.

29. Data decoding apparatus for decoding video data values, the apparatus comprising:

a parameter decoder configured to selectively decode a high bit depth control flag and, when the high bit depth control flag is set to indicate high bit depth operation, to selectively decode an extended precision flag to indicate at least extended precision operation of a spatial frequency transform stage; and a decoder configured to decode the video data values according to a mode of operation defined by the encoded high bit depth control flag and, when decoded, the extended precision flag.

30. Video data capture, transmission, display and/or storage apparatus comprising the apparatus of clause 29.

The invention claimed is:

1. A method of encoding video data values, the method comprising:

selectively encoding, via circuitry, a high bit depth control flag and, when the high bit depth control flag is set to indicate high bit depth operation, selectively encoding an extended precision flag to indicate at least extended precision operation of a spatial frequency transform stage; and encoding the video data values according to a mode of operation defined by the encoded high bit depth control flag and, when encoded, the extended precision flag, wherein the extended precision flag represents a single bit of information.

2. The method of claim 1, further comprising selectively encoding the high bit depth control flag and selectively encoding the extended precision flag to a sequence parameter set of a video data stream.

3. A non-transitory machine-readable storage medium comprising executable computer code components which, when executed on a computer, cause the computer to perform the method according to claim 1.

4. A method of decoding video data values, the method comprising:

selectively decoding an encoded high bit depth control flag and, when the high bit depth control flag is set to indicate high bit depth operation, selectively decoding an extended precision flag to indicate at least extended precision operation of a spatial frequency transform stage; and decoding the video data values, via circuitry, according to a mode of operation defined by the encoded high bit depth control flag and, when decoded, the extended precision flag, wherein the extended precision flag represents a single bit of information.

5. The method of claim 4, further comprising selectively decoding the high bit depth control flag and selectively encoding the extended precision flag from a sequence parameter set of a video data stream.

6. A non-transitory machine-readable storage medium comprising executable computer code components which, when executed on a computer, cause the computer to perform the method according to claim 4.

7. A data encoding apparatus for encoding video data values, the apparatus comprising:

parameter encoder circuitry configured to selectively encode a high bit depth control flag and, when the high bit depth control flag is set to indicate high bit depth operation, to selectively encode an extended precision flag to indicate at least extended precision operation of a spatial frequency transform stage; and encoder circuitry configured to encode the video data values according to a mode of operation defined by the encoded high bit depth control flag and, when encoded, the extended precision flag.

8. A video data capture, transmission, display and/or storage apparatus comprising the apparatus of claim 7.

9. A data decoding apparatus for decoding video data values, the apparatus comprising:

parameter decoder circuitry configured to selectively decode an encoded high bit depth control flag and, when the high bit depth control flag is set to indicate high bit depth operation, to selectively decode an extended precision flag to indicate at least extended precision operation of a spatial frequency transform stage; and decoder circuitry configured to decode the video data values according to a mode of operation defined by the encoded high bit depth control flag and, when decoded, the extended precision flag, wherein the extended precision flag represents a single bit of information.

10. A video data capture, transmission, display and/or storage apparatus comprising the apparatus of claim 9.

11. The method of claim 4, wherein the extended precision flag is provided amongst a set of one or more other Sequence Parameter Set Flags.

12. The method of claim 11, wherein the set of one or more other Sequence Parameter Set flags is only available based on at least a flag in a hierarchy of flags being set.

13. The method of claim 4, further comprising: selectively encoding the extended precision flag only when the high bit depth control flag is set to indicate high bit depth operation.

14. The method of claim 4, wherein the high bit depth control flag indicates that the bit depth is greater than 10 bits.

15. The method of claim 4, wherein the high bit depth control flag indicates that the bit depth is greater than 10 bits but not a value of bit depth in excess of 10 bits itself.

16. The method of claim 4, wherein the high bit depth control flag is set not to indicate high bit depth operation, the flag setting being the same for video data values representing respective streams of 10 or fewer bits.

17. The method of claim 4, wherein the high bit depth control flag is set to indicate high bit depth operation when at least one other flag in a hierarchy is available.

18. The method of claim 4, wherein the high bit depth control flag is set to indicate high bit depth operation indicates an availability of a set of one or more Sequence Parament Set flags, the set of one or more Sequence Parament Set flags including the extended precision flag.

* * * * *